United States Patent
Yamasaki

(10) Patent No.: US 7,346,852 B2
(45) Date of Patent: Mar. 18, 2008

(54) METHOD OF MANAGING CASUAL STORAGE FIELD

(75) Inventor: Makoto Yamasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 873 days.

(21) Appl. No.: 10/438,005

(22) Filed: May 15, 2003

(65) Prior Publication Data

US 2003/0225758 A1    Dec. 4, 2003

(30) Foreign Application Priority Data

May 16, 2002    (JP)    ............................. 2002-141634

(51) Int. Cl.
*G06F 3/00* (2006.01)
(52) U.S. Cl. .................. 715/769; 715/770; 715/255
(58) Field of Classification Search .............. 715/530, 715/769, 770, 255
See application file for complete search history.

(56) References Cited

U.S. PATENT DOCUMENTS

| | | | | |
|---|---|---|---|---|
| 5,404,442 | A * | 4/1995 | Foster et al. ............... | 715/769 |
| 5,752,254 | A * | 5/1998 | Sakairi ....................... | 715/530 |
| 5,787,448 | A * | 7/1998 | Anderson et al. ......... | 715/501.1 |
| 5,801,693 | A * | 9/1998 | Bailey ........................ | 715/769 |
| 5,889,518 | A | 3/1999 | Poreh et al. | |
| 5,903,269 | A | 5/1999 | Poreh et al. | |
| 6,040,832 | A | 3/2000 | Poreh et al. | |
| 6,222,542 | B1 | 4/2001 | Poreh et al. | |
| 6,532,474 | B2 * | 3/2003 | Iwamoto et al. ......... | 707/104.1 |
| 2002/0001000 | A1 | 1/2002 | Shpilberg et al. | |
| 2002/0051155 | A1 | 5/2002 | Fujioka et al. | |
| 2002/0080179 | A1 * | 6/2002 | Okabe et al. ............... | 345/769 |

FOREIGN PATENT DOCUMENTS

| | | |
|---|---|---|
| JP | 64-3730 | 1/1989 |
| JP | 6-124224 | 5/1994 |
| JP | 7-98687 | 4/1995 |
| JP | 2000-76367 | 3/2000 |

(Continued)

OTHER PUBLICATIONS

G. Robertson, et al., CHI 2000 Conference Proceedings, Conference on Human Factors in Computing Systems, pp. 494-501, "The Task Gallery: A 3D Window Manager" Apr. 1-5, 2000.

(Continued)

*Primary Examiner*—Kieu D. Vu
(74) *Attorney, Agent, or Firm*—Oblon, Spivak, McClelland, Maier & Neustadt, P.C.

(57) ABSTRACT

A method of managing a casual storage field comprises the steps of: receiving a plurality of information elements from one or more application programs, each information element including one or more data items; retaining the received information elements in the casual storage field; displaying a state of the casual storage field and the retained information elements; and handing over, in response to a user request, one or more of the retained information elements to an application program. The casual storage field can receive an information element from another application program, display the received information element in the display region of the casual storage field, and hand over in response to a user instruction, the information element to yet another application program.

41 Claims, 28 Drawing Sheets

FOREIGN PATENT DOCUMENTS

| | | |
|---|---|---|
| JP | 2000-250886 | 9/2000 |
| JP | 2001-22734 | 1/2001 |
| JP | 2002-502515 | 1/2002 |

OTHER PUBLICATIONS

M. P. Czerwinski, et al., Human-Computer Interaction-Proceedings of Interact '99, pp. 163-170, "The Contribution of Thumbnail Image, Mouse-Over Text and Spatial Location Memory to Web Page Retrieval in 3D", 1999.

C. C. Marshall, et al., Proceedings of ECHT94, pp. 13-23, "VIKI: Spatial Hypertext Supporting Emergent Structure", 1994.

G. Golovchinsky, et al., Fuji Xerox Technical Report, No. 13, pp. 60-75, "Hypertext Interactivity: From Choice to Participation", 2000.

U.S. Appl. No. 09/948,956, filed Sep. 7, 2001, Takahashi.

U.S. Appl. No. 09/944,444, filed Aug. 31, 2001, Fujioka et al.

U.S. Appl. No. 09/288,856, filed Apr. 9, 1999, Nagatsuka et al.

U.S. Appl. No. 09/472,249, filed Dec. 27, 1999, Shimada et al.

U.S. Appl. No. 10/006,715, filed Dec. 10, 2001, Nimura et al.

U.S. Appl. No. 10/438,005, filed May 15, 2003, Yamasaki.

\* cited by examiner

| CASUAL STORAGE FIELD ID | Space1 |
|---|---|
| NAME | CASUAL STORAGE FIELD 1 |
| DISPLAY SIZE | [1280, 1024] |
| INFORMATION ELEMENTS | (InfoItem1, InfoItem2, InfoItem3) |
| DRAWING ELEMENTS | [DrawItem1, DrawItem2, DrawItem3) |
| INFORMATION ELEMENT GROUPS | [Group1] |
| SELECTED ELEMENTS | [InfoItem1] |

FIG.5

| INFORMATION ELEMENT ID | InfoItem1 |
|---|---|
| TEXT DATA | None |
| RTF DATA | None |
| JPEG DATA | a:¥data¥infoitem1.jpg |
| BMP DATA | None |
| DIB DATA | None |
| WMF DATA | a:¥data¥infoitem1.wmf |
| FILE DATA | None |
| DISPLAY COORDINATES | [450, 250] |
| DISPLAY SIZE | [120, 80] |

FIG.6

| INFORMATION ELEMENT GROUP ID | Group1 |
|---|---|
| DISPLAY COORDINATES | [20, 20] |
| DISPLAY SIZE | [420, 500] |
| INCLUDED INFORMATION ELEMENTS | [InfoItem2, InfoItem3] |
| INCLUDED INFORMATION ELEMENT GROUPS | None |
| INCLUDED DRAWING ELEMENTS | [DrawItem1] |

| DRAWING ELEMENT ID | DrawItem1 |
|---|---|
| TYPE OF LINE | Free curve |
| COLOR | Black |
| WIDTH | 2 |
| NUMBER OF COORDINATES | 6 |
| X-COORDINATES | [625, 627, 630, 635, 640, 636] |
| Y-COORDINATES | [875, 860, 880, 795, 805, 815] |

FIG.9
[EXPANDED VIEW]
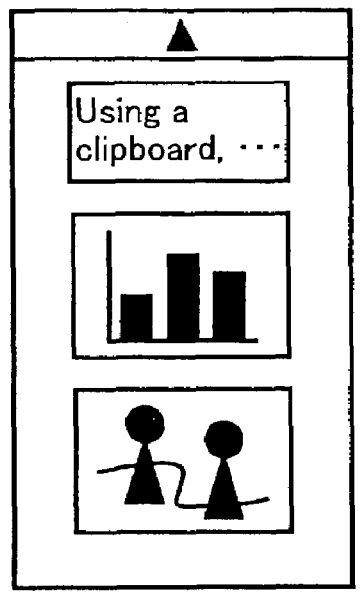
[SHRUNKEN VIEW]
FIG.10
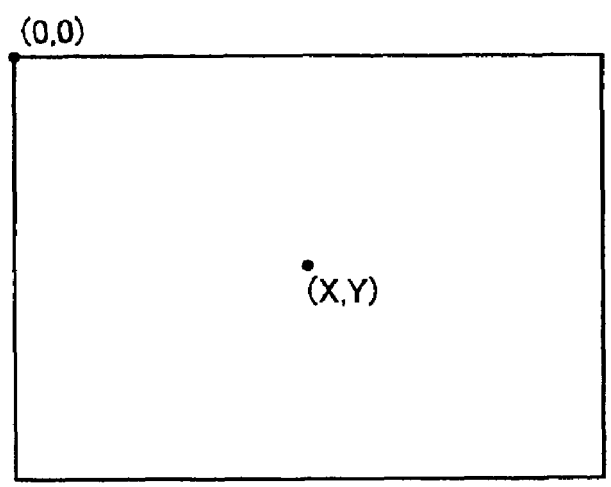

FIG.27

| RELATIONSHIP ID | TITLE OF WINDOW | CASUAL STORAGE FIELD ID |
|---|---|---|
| 1 | Information_Design.doc-Microsoft Word | Space1 |
| 2 | FirstHalf_ActualResult.xls-Microsoft Excel | Space5 |
| 3 | Sample.bmp-PAINT | Space23 |
| 4 | ThankYouNote-Lotus Notes | Space12 |
| | | |

| DATA TYPE | CONTENTS OF DATA |
|---|---|
| TEXT | "The specification shall contain a written description of the invention, and of the manner and process of making and using it, ... |
| RICH TEXT | {¥rtf1¥ansi¥ansicpg932¥uc2 ¥deff0¥deflag1033¥deflangfe1041{¥... |
|  |  |
|  |  |

METHOD OF MANAGING CASUAL STORAGE FIELD

BACKGROUND OF THE INVENTION

1. Field of the Invention

The present invention generally relates to a method of managing a casual storage field, and further relates to an apparatus, an image forming apparatus, a computer program, and a computer readable recording medium storing therein a computer program for managing a casual storage field.

The present invention more particularly relates to a method of, an apparatus for, an image forming apparatus for, a computer program for, and a computer readable recording medium storing a computer program for managing a casual storage field that can store a plurality of information items therein and can hand over an information item received from an application program to another application program that accesses the information item.

2. Description of the Related Art

The related art relative to the present invention will be described below. A general user interface will be described first.

[General User Interface]

A computer system for office use is usually equipped with a display unit and various input units. The display unit is a two-dimensional display device such as a CRT and an LCD. The input units include both a keyboard and a pointing input device such as a mouse, a pen-tablet, a touch panel, a track ball, and a touch pad. The mouse is one of the handiest pointing devices. The pen tablet is also common for an application that requires inputting hand-written characters and drawings.

A screen is displayed in a window. The window is a square region of arbitrary size that is separate and independent from the other region. When the windows overlap, the window in the back is hidden behind the window in the front (overlapping window). The position pointed at by the pointing device is indicated by an arrow called a pointer.

The computer system stores a plurality of application programs, and runs one or more of the application programs simultaneously.

[Duplicating and Moving Data Item in a General Application Program]

In a general application program such as a word processor, a user can duplicate or move a data item. For example, the user selects an object, and gives the application program an instruction to duplicate or cut the object. In the case of cutting, the selected object is temporarily deleted from the screen. The user points at the position to which the user desires to duplicate or move the object, and gives the application program an instruction to paste the object at the position. In response to this instruction, the application program pastes the object that is duplicated or cut in advance.

The user can also "drag and drop" the object using the pointing device such as the mouse. In this case, the user presses a click button provided on the mouse, for example, with the pointer on the object, and moves the pointer with the click button pressed. When the pointer arrives at the position at which the user desires to duplicate or move the object, the user releases the click button.

[An Example of User Interface: Clip Board]

The present invention uses a user interface such as a clipboard. Operating systems such as Microsoft Windows 2000™ are provided with a mediate region called a clipboard through which a plurality of application programs can exchange the data item. The object is duplicated or cut and pasted through the clipboard. The clipboard temporarily stores therein various data items such as a string and an image, and also stores therein the data type of the stored data items. The application programs can exchange the data items with each other through this region.

The plurality of application programs stores data items therein or retrieves the stored data items in compliance with a predetermined procedure to exchange (duplicating and moving, for example) the data items with each other. The procedure with which the data items are stored to and retrieved from the clipboard will not be described in this specification since its technical information is available from the software vendors of such a clipboard.

Recent improvement in the clipboard provides the user with flexible duplication and movement of the data items. The improved clipboard stores therein data items one after another. The stored data items are listed in a predetermined region in the window of the application program. The user selects one of the listed data items and can paste at any time the selected data item in a document that the user is writing. If a plurality of application programs supporting the improved clipboard run simultaneously, one of the application programs can access the data items stored in the improved clipboard by the other application programs.

The improved clipboard can store therein data items of different data types.

[Temporary Storage of a Drawing]

The related art described in some patent laid-open applications will be described below.

Japanese Patent Laid-open Application No. 2001-22734 discloses an information processing apparatus that can easily and efficiently display at sight a plurality of document files to the extent a user can identify the contents of the document files.

FIG. 34 is a block diagram showing this information processing apparatus. The information processing apparatus of FIG. 34 is configured by the following: a display unit 301, a folder generating unit 302, a folder designating unit 303, a display controlling unit 304, an at-sight display file generating unit 305, and a document file selecting unit 306.

The display unit 301 displays a screen. The folder generating unit 302 generates, in a storage unit or a predetermined region of a network, folders of a multi-level hierarchical structure that can store therein plural document files generated by an application program having a document generating function or sub-folders. The folder designating unit 303 designates one of the folders generated by the folder generating unit 302.

The display controlling unit 304 displays at sight a part or all of the plurality of document files designated by the folder designating unit 303. The at-sight display file generating unit 305 generates an at-sight display file containing the contents of the plurality of document files designated by the folder designating unit 303. The document file selecting unit 306 selects one of the document files displayed at sight.

This related art patent laid-open application describes an application program of a word processor provided with a "work space function". According to the paragraph No. 89 of this patent laid-open application, "the work space is provided besides the edited document so that the user can temporarily display a drawing and can layout the document efficiently." "Since, even when the document is printed, the drawing is not printed, the user can edit the document efficiently." In the above description, the edited document means a sheet of paper, and what is temporarily stored is the drawing. Additionally, this patent laid-open application fails to describe how to realize the temporary storage.

[Work Space]

The work space will be described below in connection with the user interface. The work space is also mentioned in the above patent laid-open application.

An environment in which a user can arrange a plurality of information items and tools that are provided by a computer system is proposed. Such an environment is known as an "information work space" system.

A plurality of representative information items (display objects representing the information items) are positioned in a certain space. The space is a predetermined region in a two-dimensional plane. Though the concepts corresponding to the space and the representative information items are referred to by various names in other documents describing the related art, the concept corresponding to the space will be referred to as the "work space" and the concept corresponding to the representative information item is referred to as the "information element" in this specification.

"Task Gallery" described in "The Task Gallery: A 3D Windows™ Manager", Robertson, G. G. et al. (2000), In Proceedings of CHI' 2000, Human Factors in Computing Systems, ACM press, pp. 494-501, is an example of the work space. This is a three-dimensional environment with which the user can improve the efficiency of tasks by managing documents and application programs to be used for each task. The work space is represented as if it were the room of a gallery. The information element (information item) is disposed on the wall or the ceiling of the room as a shrunk image of the document.

Likewise, many work space systems represent the disposed document as the shrunk image of the document (thumbnail). The use of thumbnails is reported to help users to efficiently identify the documents according to Czerwinski, M., van Dantzich, M., Robertson, G. G. & Hoffman, H. (1999), "The contribution of thumbnail images, mouse-over text and spatial location memory to web page retrieval in 3D", In Sasse, A. & Johnson, C. (Eds), Human-Computer Interaction-Proceedings of Interact'99, Edinburgh, Scotland, IOS press, pp. 163-170.

Japanese Patent Laid-open Application No. 2000-76367 discloses an invention of a work process management apparatus in which a user is provided with a plurality of work spaces and can manage information resources by the work space. Each work space is provided with a two-dimensional space dividable into a plurality of regions (background regions). An information element (information item) to refer to a document or another work space is correlated to each background region. Accordingly, the user can separately arrange the information resources in each background region. The above function can be regarded as a method to classify the information resources.

[Inspiration Support System]

By the way, an inspiration support system also requires a user interface. According to a well-known method of supporting inspiration, one can improve, by writing an information item on a card and appropriately disposing the cards on a two-dimensional plane, the efficiency of brain work such as an inspiration that requires the handling of abstract concepts.

For example, "A method of inspiring", J. Kawakita (1967), Chuo-Koron, describes a method of supporting inspiration including the following steps: spatially disposing information elements (information items), grouping the disposed information elements, assigning a title to the grouped information elements, and correlating the information elements. One can compare ideas and analyze the groups of information elements, for example, using this method.

For example, Japanese Patent Laid-open Application No. 7-98687 discloses "KJ method", a method of supporting inspiration for a group. According to this patent laid-open application the opinions of members are summarized by the following procedure:

Step 1: A theme is determined.

Step 2: Each member writes an information item directly or indirectly relevant to the theme in a short sentence on a card.

Step 3: All members dispose their cards on a large desk so that they can read all the cards.

Step 4: The cards containing information relevant to each other are gathered so that the cards form an "island".

Step 5: A super-ordinate concept common to all cards forming the "island" is extracted and written on a card (compatible card). The compatible card is put on the top of the stack of the cards belonging to the "island".

Step 6: The above steps 4 and 5 are repeated. The stacks of the cards are disposed on a large sheet of paper based on the relevance between the "islands".

Step 7: Each stack is spread out, and the cards belonging to the stack are attached to the large sheet of paper in accordance with the disposition.

Step 8: The cards forming the island are surrounded by a closed line of various colors and thicknesses. A relevance chart (or compatibility chart) is completed.

Step 9: All members make sure of the reasoning path to the conclusion based on the relevance chart.

Step 10: The conclusion and the reasoning path are reported or are explained to an audience.

Computer programs that realize such methods of supporting inspiration on computers are already available in the market as inspiration supporting systems (Inspiration 6: Inspiration Software, Inc., for example). Using such an inspiration supporting system, a user can display a plurality of display objects representing information elements on the screen of the computer and can edit the positions of the display objects. Some computer programs support not only editing the position of an information element, but also setting and displaying the following: the name and graphical expression of an information element, the correlation between information elements, and the grouping of information elements.

VIKI described in "VIKI: Spatial hypertext supporting emergent structure" (1994), In: N. Guimaraes, ed. Proceedings of ECHT94, New York: ACM Press, pp. 13-23, is a spatial hypertext system that disposes information elements and sets of information elements in a two-dimensional space.

This spatial hypertext system helps a user to express and understand the relationship between the information elements by spatially disposing a plurality of information elements. This spatial hypertext system has a similar function to the above inspiration supporting system in the sense that the user understands the structure of the information elements by spatially disposing and grouping the information elements. VIKI is provided with a function to extract and use an implied structure of the disposition of the information elements, which makes users to easily manipulate the grouping and understand displayed group structure. For example, when a plurality of information elements are disposed with the positions of their left ends aligned, the system recognizes that they are related to each other.

When creating a document, one may draw some drawings and write some paragraphs first. One may also pick up some drawings and some paragraphs from documents already created. Considering the order of description and the layout of the document, one completes the document.

If the collection of materials and the creation of a document are separated, the job becomes simple and efficient. In this job method, it is necessary to temporarily store a plurality of materials in a region (temporary storage field of information) and paste the materials, if necessary, in the document using an application program for editing the document.

In the case of a conventional duplicate & paste function, one can store the data of only one object on the clipboard.

Using an ordinary application program for editing a document, one can temporarily dispose required objects in the edited document or a newly created document for temporary storage. Accordingly, it is possible to manage the as-temporarily stored objects in a temporary storage state.

This method, however, inherits some problems. First, in the case where the material is disposed in the edited document, a temporary storage field is required in the document. One may have to lay out the document in a manner that is different from the writer's intention. It is confusingly difficult to discriminate between the temporarily stored object and an already laid out object.

Secondly, in the case where the material is disposed in the new document, the new document occupies a certain region on the screen. It is difficult to discriminate between the new document for temporary storage and the edited document because both documents are formatted by the same application program.

As described above, the improved clipboard temporarily stores therein data related to a plurality of objects by respective formats, and lets the user review the objects. The improved clipboard is displayed in a format different from that of the edited document. The user can easily discriminate between the improved clipboard and the edited document.

However, only the application programs provided by the software vendor that provides the improved clipboard can access the improved clipboard. The application programs provided by the other software vendors cannot access the data stored in the improved clipboard.

The improved clipboard still needs to be further improved with respect to its operation. Even when the user desires to store data in the improved clipboard, the user does not necessarily desire to duplicate or cut the data. In the case of the improved clipboard, the user is required to follow the procedure to duplicate or cut the data on the improved clipboard.

Additionally, the improved clipboard is available only while the application program provided by the software vendor that provides the improved clipboard is activated. Accordingly, the improved clipboard cannot hold the data stored therein until the improved clipboard is activated next time.

Furthermore, when the user works on different jobs and different documents in parallel, the user needs to use a plurality of temporary storage fields in accordance with the jobs and documents on which the user works. No clipboard supports such a requirement.

As described above, when a user creates a document, the conventional technique causes various problems.

In addition, an inspiration support system needs to process and arrange information to support a user's processing and arranging of information, and to inspire the user.

For example, using the above inspiration support system called "KJ method", the users gather the cards to form the "island", and write a super-ordinate concept common to all cards forming the "island", and put the concept card on the top of the island.

The users dispose the stacks of the cards on a large sheet of paper based on the relevance between the "islands", and spreading each stack, attach the cards belonging to the stack to the large sheet of paper in accordance with the determined disposition. The users surround the cards forming the islands by a closed line of various colors and thicknesses and complete the relevance chart (the compatibility chart).

Conventionally, such an inspiration support system functions as a closed system. The inspiration support system, however, needs to receive information elements from other application programs or to hand over processed information elements or the result of inspiration supporting.

The conventional user interface cannot improve the collaboration between the inspiration support system and the other application programs. The conventional clipboard and the improved clipboard cannot support such an inspiration support system that helps the user process and arrange information.

The temporary storage field for an inspiration support system, when many information elements are stored therein, needs to help users to appropriately manage and efficiently use the information elements. Such a temporary storage field is not proposed yet.

It is convenient to express the relationships between information elements stored in the temporary storage field. According to a known method, the user can move around the information elements in a certain region. The user can imply the closeness and similarity among information elements by changing the position at which each information element is displayed.

Information work space systems, for example, are equipped with such a function. The information work space systems, however, are not equipped with a function to receive data from other application programs or to hand over properly formatted data to other application programs. The function provided by the temporary storage field does not satisfy the requirement of the temporary storage field for an inspiration support system. The conventional temporary storage field does not disclose the technique to realize spatial disposition of information elements.

The user may want to define groups of information elements and arrange the information elements in accordance with the defined groups so that the user can manipulate the information elements easily. Accordingly, the temporary storage field for inspiration support systems needs to support such a function.

Some techniques to realize the grouping of information elements have been already disclosed. For example, Japanese Patent Laid-open Application No. 2000-76367 discloses a concept "background region" with which the user can group the information elements. According to this conventional technique, an information element needs to be attached to one of the background regions from the beginning; it takes time to create a new group during a job, and to regroup the information elements. To the contrary, the temporary storage field for an inspiration support system needs to allow the user to define groups anytime, if necessary. The "KJ method" proposes a method of supporting inspiration based on the grouping of information elements.

If an apparatus that provides a temporary storage field is provided with a function to express groups of information elements, the apparatus can inspire the user using the grouped information elements. Japanese Patent Laid-open Application No. 2000-76367 does not disclose a method of expressing the relationships between the background regions. The user cannot appropriately express the order and comparable relationships between the background regions, and the method fails to support inspiration using the grouped information elements. Thus, the grouping function that can be coupled with a method of expressing structure (to be described later) needs to be realized.

In addition, the grouping of information is usually hierarchical, that is, a group of information may include therein another group of information as a subgroup. The method of grouping information elements needs to support the hierarchical grouping.

The relationships between information elements generally include contrast relationship and causal relationship. These relationships may be expressed by an arrow, for example, correlating or connecting information elements. Inspiration support tools such as Inspiration 6 (Inspiration Software, Inc.) provides a function that connects information items by arrows.

Especially, "ISOP Cho-Hassohou Version 3.0" (ITEC Inc.) is aimed at supporting the "KJ method". It provides functions such as the grouping of information elements and the correlating of information elements, or groups of the information elements.

Graphic editing application programs, word processors, and page layout application programs, for example, have functions such as disposing images, text, and drawings, and drawing rectangles and free curves. They further have functions such as grouping those elements, moving the elements in a block, and deleting.

These application programs, however, are not intended to provide a temporary storage field. For example, they do not support a function to exchange data of a plurality of formats with another application program. Such functions are inevitable for the temporary storage field.

The user may want to attach meta-information to each information element. XLibris is the conventional technique that allows the user to add free style meta-information to the information elements.

XLibris, however, is designed to support the reader of a document by enabling the reader to write comments on the document; the information elements are essentially shrunk and displayed in the form of thumbnails. As a result, even when a part of the document (only few words, for example) is displayed, only the thumbnail of the page is displayed. The user cannot recognize the contents of the information element at a glance. XLibris does not support a function to spatially dispose drawings and pictures. Due to the lack of these functions, XLibris does not satisfy the requirement of the temporary storage field for an inspiration support system.

SUMMARY OF THE INVENTION

Accordingly, it is an object of the present invention to provide a method of managing a casual storage field, a casual storage field management apparatus, an image forming apparatus, a computer program, and a computer readable recording medium including a computer program for managing the casual storage field flexibly and efficiently.

To achieve the above object, a method of managing a casual storage field according to the present invention comprises the steps of: receiving a plurality of information elements from one or more application programs, each information element including one or more data items; retaining the received information elements in said casual storage field; displaying a state of said casual storage field and the retained information elements; and handing over, in response to a user request, one or more of the retained information elements to an application program.

According to the method of managing a casual storage field of the present invention, the casual storage field can receive an information element from another application program, display the received information element in the display region of the casual storage field, and hand over, in response to a user instruction, the information element to yet another application program. The user can temporarily or even permanently store the information element in the casual storage field, and can use the information element when desired.

Other objects, features, and advantages of the present invention will become more apparent from the following detailed description when read in conjunction with the accompanying drawings.

BRIEF DESCRIPTION OF THE DRAWINGS

FIG. 5 illustrates the data structure of an information element according to an embodiment;

FIG. 6 illustrates the data structure of an information element group according to an embodiment;

FIG. 9 is a schematic diagram for explaining the change in display size of a casual storage field according to an embodiment;

FIG. 10 is a schematic diagram for explaining the coordinate provided in a casual storage field displayed on a screen according to an embodiment;

FIG. 27 illustrates a table indicating the correlation between a window title and a casual storage field ID according to an embodiment;

DETAILED DESCRIPTION OF THE PREFERRED EMBODIMENTS

The preferred embodiments of the present invention will be described by reference to the drawings.

[Hardware Configuration]

Figure 1:
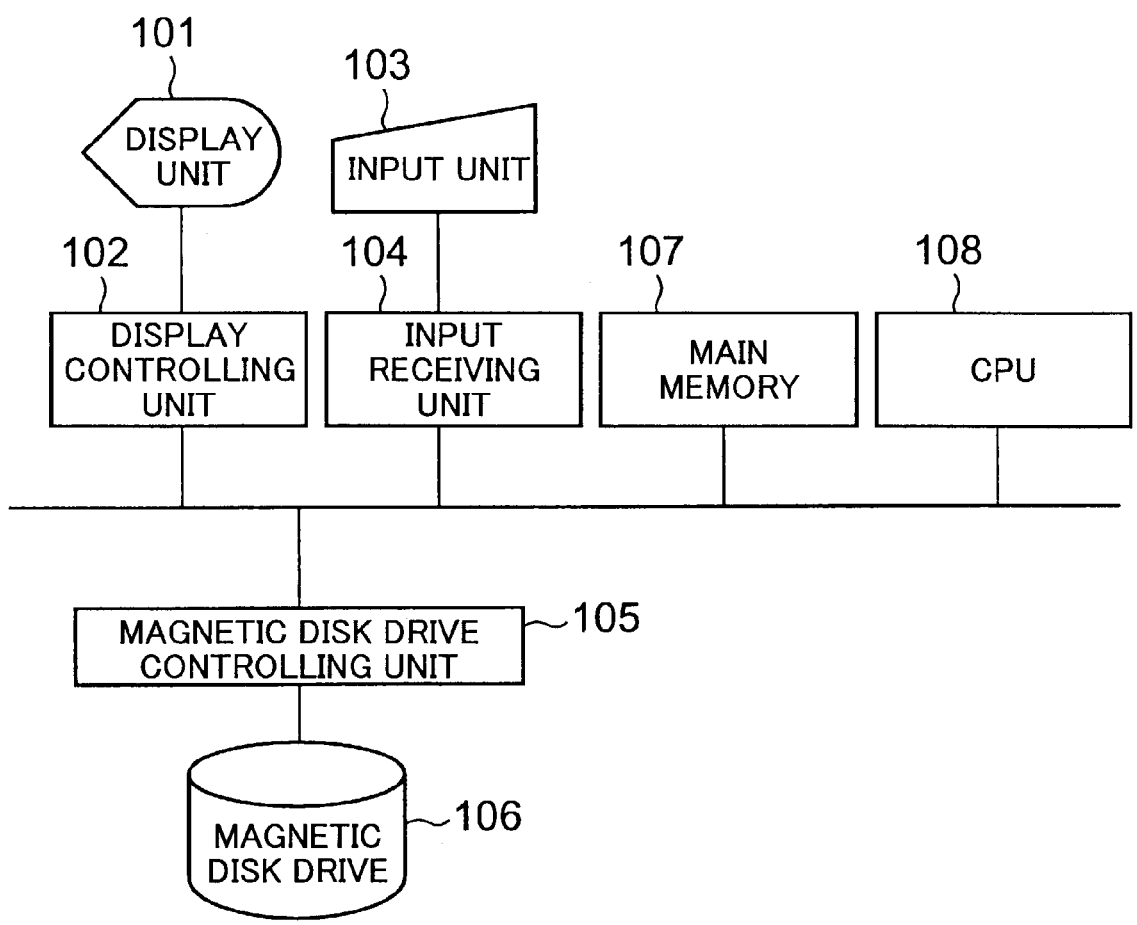
FIG. 1 is a block diagram showing the hardware configuration of an apparatus for managing a casual storage field according to an embodiment of the present invention.

FIG. 1 is a block diagram showing a casual storage field management apparatus according to an embodiment. A display unit 101 is a two-dimensional display device such as a CRT display. An input unit 103 includes a keyboard and a mouse, for example. The input unit 103 needs to include at least a device to input the coordinate such as a mouse. A display control unit 102 and an input receiving unit 104 are the interfaces of the display unit 101 and the input unit 103, respectively. A magnetic disk drive 106 is controlled by a magnetic disk drive control unit 105. The casual storage field management apparatus is provided with a main memory unit 107 and CPU 108. All elements are connected to each other through a bus.

[Functional Configuration]

A computer program for managing the casual storage field according to the present invention is stored in the magnetic disk drive 106 or the main memory unit 107. CPU 108 retrieves and runs the computer program.

Figure 2:
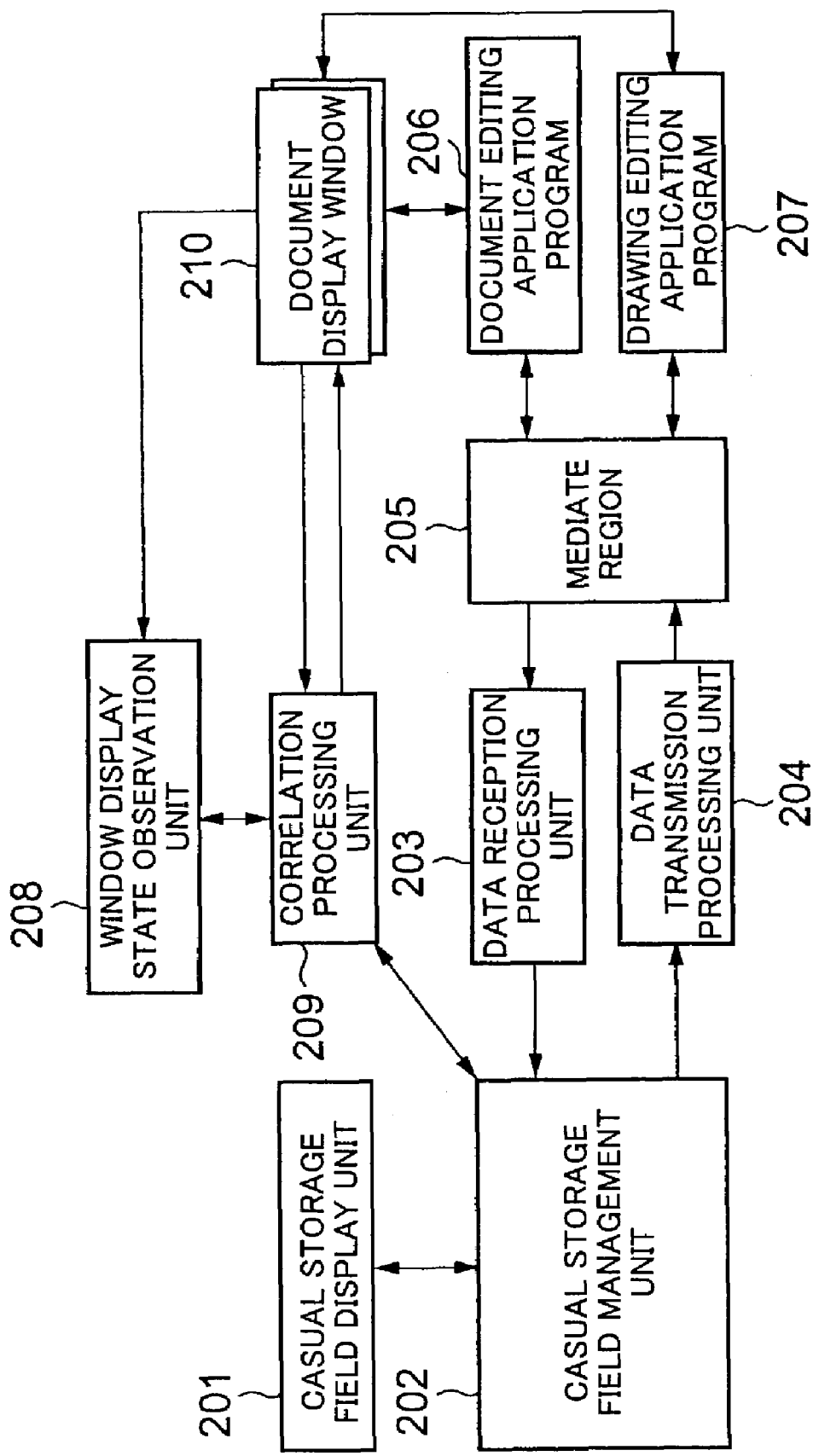
FIG. 2 is a block diagram showing the functional structure of an apparatus for managing a casual storage field according to an embodiment.

FIG. 2 is a schematic diagram showing the functional configuration of the casual storage field management apparatus according to an embodiment. A casual storage field management unit 202 manages the casual storage field and objects stored therein. The casual storage field management unit 202 is an ordinary database management system, for example. A casual storage field display unit 201 is a window object to display the state of the casual storage field. The casual storage field display unit 201 informs the casual storage field management unit 202 of a user input in connection with the casual storage field.

A document editing application program 206 and a drawing editing application program 207 are ordinary application programs available in the market. A data reception processing unit 203 is a computer program that obtains data stored in a mediate region 205 by the document editing application program 206 and the drawing editing application program 207, and registers the data in the casual storage field management unit 202. A data transmission processing unit 204 is a computer program to store data related to the casual storage field in the mediate region 205 so as to transmit the data to the document editing application program 206 and the drawing editing application program 207. The mediate region 205 is provided by an operating system. When the casual storage field management apparatus is used as an inspiration support system, an inspiration support application program is used as well as the document editing application program 206 and the drawing editing application program 207. If the inspiration support application program includes a document editing software program and a drawing editing application program as a package, only the inspiration support application program is used instead of the document editing application program 206 and the drawing editing application program 207.

A document display window 210 is a window object displayed by the document editing application program 206, the drawing editing application program 207, and so forth. A plurality of document display windows 210 may be displayed simultaneously. When a document display window 210 is displayed, is enlarged (shrunk), or is moved, for example, a window display state observation unit 208 receives an event. A correlation processing unit 209 processes the correlation between the document display window 210 and the casual storage field.

[Data Structure]

Figures 3, 4:
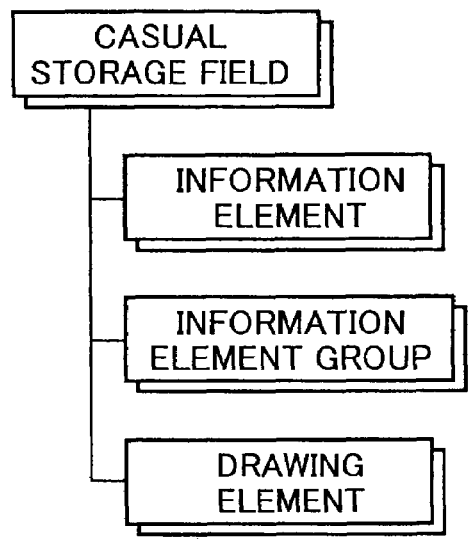
FIG. 3 is a schematic diagram for explaining the mutual relationship among a casual storage field, an information element, an information element group, and a drawing element according to an embodiment.
FIG. 4 illustrates the data structure of a casual storage field according to an embodiment.

FIG. 3 is a schematic diagram for explaining the mutual relationship among the casual storage field, an information element (information item), a drawing element (drawing item), and an information element group. The casual storage field management apparatus according to an embodiment includes a plurality of casual storage fields.

The casual storage field is an object including a plurality of information elements, a plurality of information element groups, and a plurality of drawing elements. The data structure of the casual storage field is showed in FIG. 4, and includes a casual storage field ID, name, display size, information elements, drawing elements, information element groups, and selected elements. FIG. 4 shows an example in which the temperature storage field ID is [Space1]. The display size is 1280 pixels wide and 1024 pixels high; information elements are [InfoItem1], [InfoItem2], and [InfoItem3]; drawing elements are [DrawItem1], [DrawItem2], and [DrawItem3]; the information element group is [Group1]. The information element [InfoItem1] is currently selected. If a plurality of elements are selected, the selected elements are stored as a string. Though the coordinates are measured by pixels in this example, any unit that can indicate the area of the screen is acceptable.

The information element is an object representing each information item registered in the casual storage field. As showed in FIG. 5, the data structure of the information element includes the following: an information element ID; data of various types (the location (path, for example) of the stored data, if any, or indication that no data are stored); a related file (the location (path, for example) of the stored file, if any, or indication that no file is stored); the coordinates at which the information element is displayed; and the window size in which the information element is displayed. The data of various types include the following: text data, Rich Text Format (RTF) data, Joint Photographic Experts Group (JPEG) data, Bit Map (BMP) data, Device Independent Bitmap (DIB) data, and Windows™ Meta-File (WMF) data.

FIG. 5 illustrates an example where the information element ID is "InfoItem1". The information element of FIG. 5 indicates that JPEG data and WMF data are stored at "a:¥data¥infoitem1.jpg" and "a:¥data¥infoitem1.wmf", respectively. No other data such as text data and RTF data are stored. The information element is displayed in a 120 pixels-wide, 90 pixels-high window at the coordinate (450, 250).

The information element group refers to a plurality of information elements, a plurality of information element groups, and a plurality of drawing elements as members. FIG. 6 illustrates the data structure of the information element group including an information element group ID, a display coordinate, display size, and members.

The example of FIG. 6 is an information element group of which the information element group ID is "Group1". The information element group is displayed in a 420 pixels wide, 500 pixels high window at the coordinates (20, 20). It includes group members of information elements "InfoItem2" and "InfoItem3", and a drawing element "DrawItem1".

Figures 7, 8:
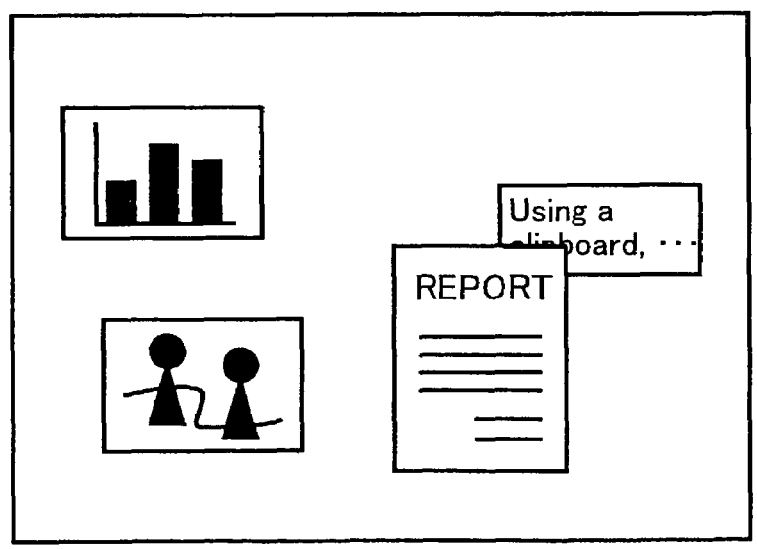
FIG. 7 illustrates the data structure of a drawing element according to an embodiment.
FIG. 8 illustrates a casual storage field displayed on a screen according to an embodiment.

A drawing element is an object representing a line drawn on the casual storage field. FIG. 7 illustrates the data structure of the drawing element, which includes a drawing element ID, the type of line, the color of line, the width of line, the number of stored coordinates, the sequence of X-coordinates, and the sequence of Y-coordinates. The example of FIG. 7 is a drawing element of a drawing element ID "DrawItem1". The type of line is "free curve"; the color of line is "black"; the width of line is "2 pixels"; the number of coordinates is "6". The X-coordinates and Y-coordinates are indicated as well.

[Overview of the Entire Process]

A method of managing a casual storage field according to the present invention includes the following steps: a step of displaying a casual storage field; a step of receiving data from another application program; a step of displaying an information element; a step of selecting an information element; a step of moving the display position of an information element; a step of transmitting data related to the selected information element, to the selected application program; a step of defining an information element group; a step of registering an information element to an information element group as a member; a step of deleting a designated information element from an information element group; a step of drawing a line on the casual storage field in accordance with input coordinates; and so forth. Each step will be described below.

[Displaying a Casual Storage Field]

In the step of displaying a casual storage field, a rectangular display region is generated on the screen. The state of the casual storage field is displayed in the square display region. FIG. 8 illustrates the square display region, in which information elements such as a drawing, a document file indicated as a thumbnail, and text are displayed.

The information elements are disposed in a relatively simple two-dimensional plane in which the user can recognize and manipulate the information elements easily. If the two-dimensional plane is expanded to a three-dimensional space or if the two-dimensional plane is made a non-Euclidian plane, for example, the number of information elements can be increased. The casual storage field may not be necessarily as small as the rectangular display region. If the casual storage field is assumed to be larger than the rectangular display region (virtual space), the user can dispose more information elements in the virtual space than on the actual screen. The user can see the information elements disposed off the screen (out of view) by zooming or panning.

According to an embodiment of the present invention, information elements are displayed in a screen region (window) other than the screen region displayed by the document editing application program. The user can temporarily or even permanently store information elements in this screen region.

If there are a plurality of windows overlapping on the screen, the user may desire to hide the window of the casual storage field so that the user can always display the window of the document editing application program, for example, over the window of the casual storage field. The method of managing the casual storage field according to an embodiment can always display the window of the casual storage field behind the other windows.

If the user desires to always keep the window of the casual storage field at a visible position, the method of managing the casual storage field according to an embodiment can always display the window of the casual storage field on top of the overlapping windows. The user can directly access the window of the casual storage field any time.

In the case where the display region of the casual storage field is displayed on this side (on top), the display size of the display region can be changed so as not to interrupt accessing the other windows. In this case, the display size of the display region of the casual storage field is changed, as showed in FIG. 9, in response to the operation of the user.

A coordinate space needs to be provided in the display region of the casual storage field so that the information elements are disposed therein. Accordingly, the display region of the casual storage field as showed in FIG. 10 is a rectangle in which grid-shaped two-dimensional coordinates (X, Y) are provided with the origin at the upper left corner. The location of an information element, for example, in the casual storage field is expressed based on the coordinate (X, Y).

[Receiving Data]

Data are received from another application program such as the document editing application program, and an information element representing the data is displayed in the casual storage field.

The mediate region provided by an operating system is used to execute this step. Any mediate region provided by the operating systems generally available is usable, and its specifications do not matter. The above clipboard is an example of the mediate region. An application program can determine whether data of a designated data type is stored in the mediate region and obtain the data of designated data type by causing the operating system to execute commands in compliance with publicly known procedure.

When the user hands over data to the casual storage field, the step of receiving data is activated. In this step, the user drags and drops, for example, a display object from an application program to the casual storage field.

The data are handed over from the application program to the mediate region in compliance with the procedure defined by the operating system. For example, the data to be handed over to the mediate region are assumed to be already stored by the application program before the step of receiving data is activated.

Figure 11:
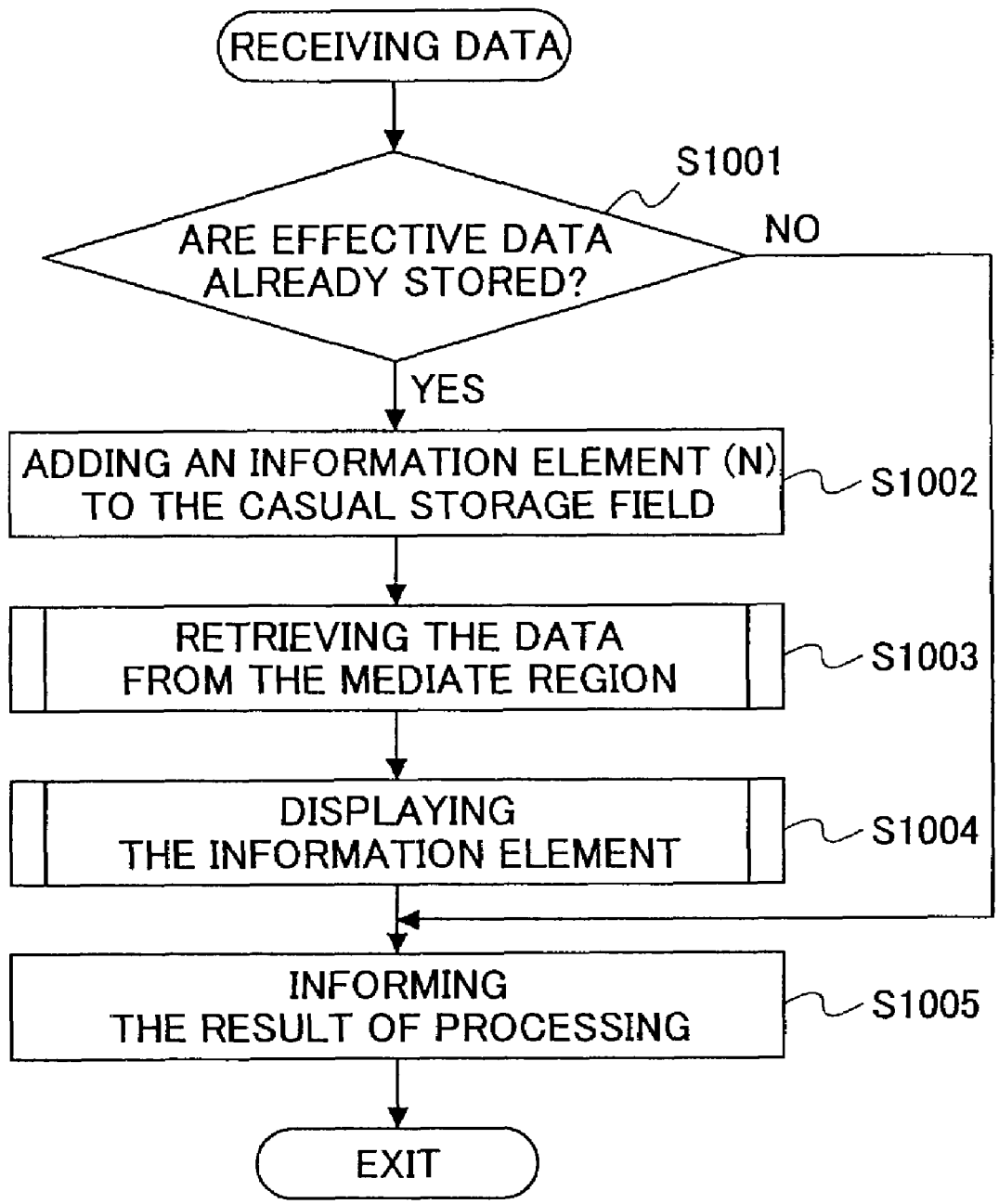
FIG. 11 is a flow chart for explaining a process of receiving a data item according to an embodiment.

FIG. 11 shows the step of receiving data. In S1001, it is determined whether effective data is already stored in the mediate region. If no effective data are stored, the step of receiving data is terminated. If it is determined that effective data are already stored, the effective data are stored in the casual storage field in S1002. In S1003, the data stored in the mediate region are retrieved, and correlated with the added information element. The correlated information element is displayed in S1004. In S1005, the application program handing over the data is informed of the result of processing. In response to this information, the application program executes processing, if necessary. For example, in the case where the user gives an instruction to move the data, the application program handing over the data deletes, in response to this information, the display object corresponding to the data.

The case where the step of receiving data is activated only once is described above. In the case where the step of receiving data is activated repeatedly, information elements corresponding to the data received in activation are added to the casual storage field and correlated with the data.

In the case where data related to plural objects are handed over to the casual storage field via the mediate region using the step of receiving data described above, it is possible to receive data items one by one, and add and display plural corresponding information elements.

[Obtaining and Holding Peripheral Data]

Data that are not stored in the mediate region may be obtainable from the application data.

In the case of Microsoft Internet Explorer 5™, for example, one can obtain, from an exterior, a path or a uniform resource locator (URL) at which a document is stored by using disclosed method. When data are handed over from such an application program, it is possible to obtain the URL of a document and so forth including an information element (that is, the document that is currently displayed and is dragged by the user) and to correlate it with the new information element even if the URL of the document is not stored in the mediate region.

Figure 12:
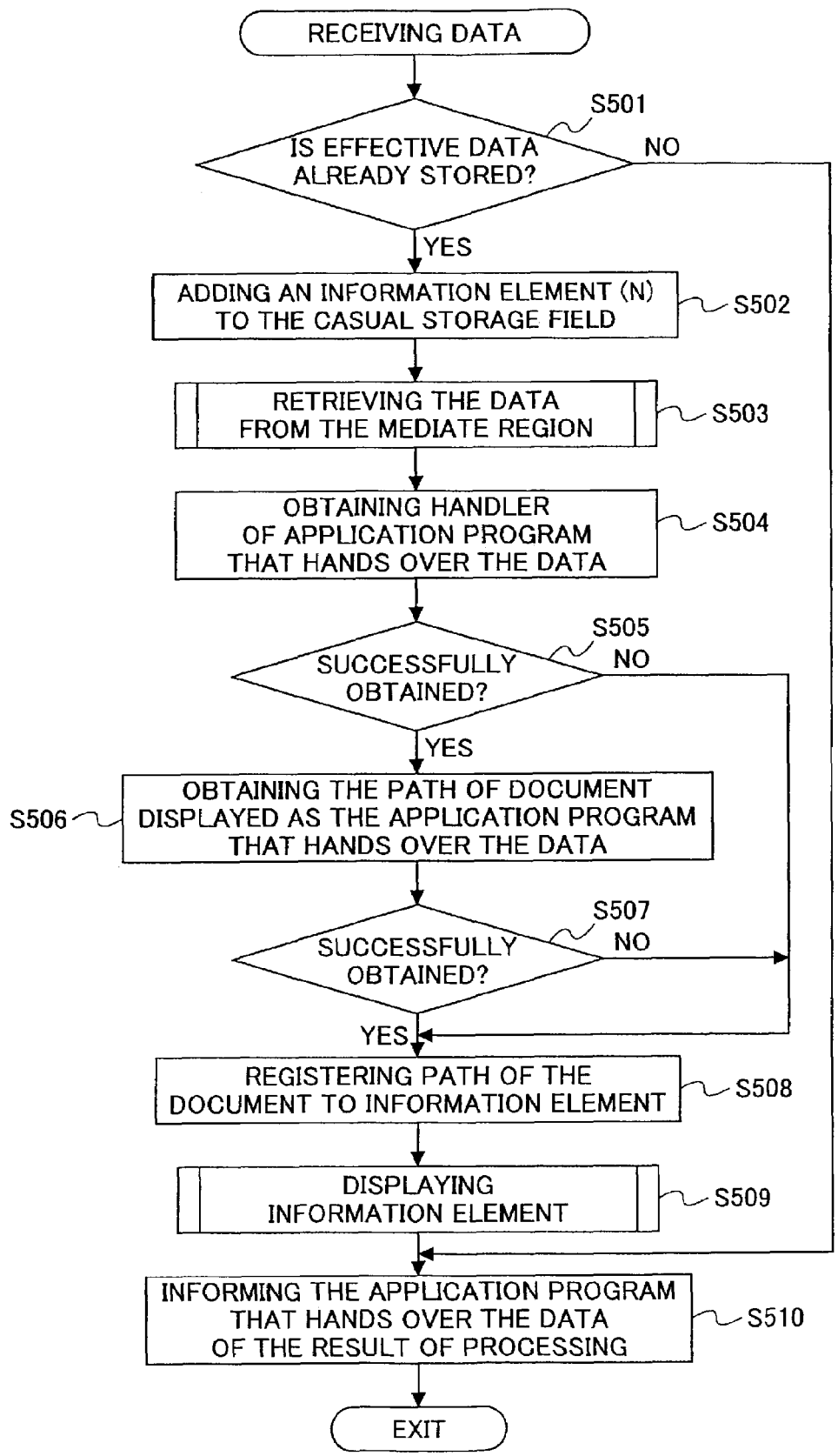
FIG. 12 is another flow chart for explaining a process of receiving a data item according to an embodiment.

In the case of a method of managing a casual storage field according to the present invention, a data is received in compliance with the procedure showed in FIG. 12. The case where the file path of the document from which the data item is handed over is obtained and stored will be described below. The steps S501 through S503 are identical to the steps S1001 through S1003 of FIG. 11. In S504, the application program that hands over the data is examined by querying the operating system.

For example, the window that, when data are handed over, is active is examined, and the application program that hands over the data is determined by identifying the application program that displays the window. If the application program that hands over the data cannot be identified, S509 and S510 are executed in the same manner as S1004 and S1005 of FIG. 11.

If the application program that hands over the data is obtained, the path of a document that is currently active is examined (S508). This document is generally the document that has handed over the data. If this document cannot be obtained, the next step S509 is performed. The obtained path of the document is registered at the new information element N (S508). The remaining steps are identical to those of FIG. 11.

[Obtaining Data From the Mediate Region]

The step of obtaining data from the mediate region is included in the above step of receiving data. The application program that hands over the data sometimes stores data items of plural data types in the mediate region. In this case, the data types of the stored data items are examined, and each data item is retrieved one by one. In the following description, the data types of the stored data items are expressed as data types A, B, C . . . .

Figure 13:
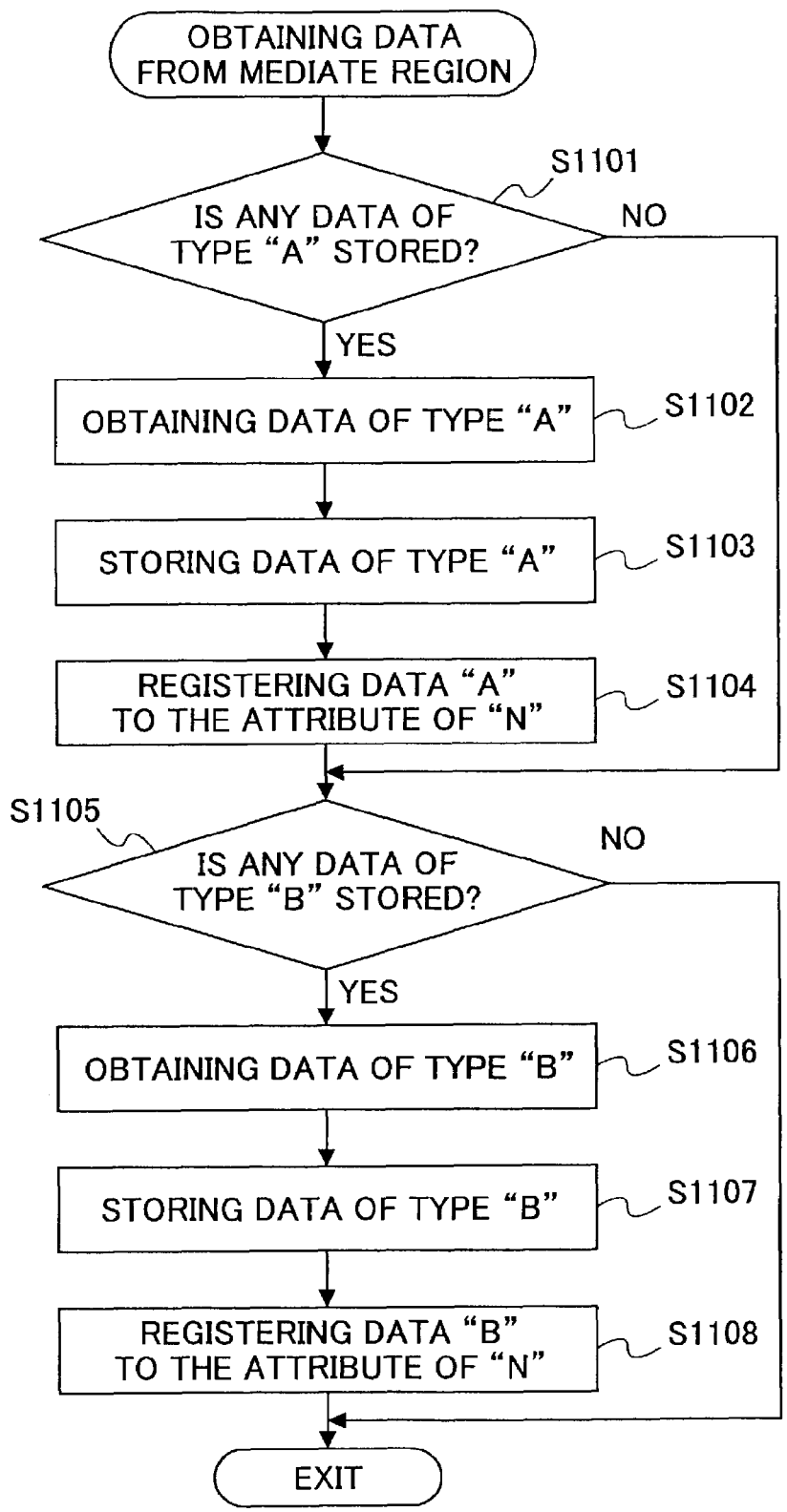
FIG. 13 is a flow chart for explaining a process of obtaining data items from a mediate region according to an embodiment.

FIG. 13 shows the procedure of obtaining data from the mediate region. In S1101, it is determined whether there are data of data type "A" stored in the mediate region. If no data of data type "A" are stored in the mediate region, the next data type is examined (S1105). If there are data of data type "A" stored in the mediate region, the data item is retrieved (S1102). In S1103, the obtained data item is stored using an ordinary file system or data base management system. In S1104, the information element "N" that is generated in S1002 and this data item are correlated to each other by, for example, registering the path of the file in which the obtained data item is stored as the attribute of the information element "N".

In steps S1105 through S1108, the steps S1101 through S1104 are repeated for data type "B". The data items of plural data types are obtained by repeating the steps described above as many times as the number of data types to be obtained.

In the case where data items of plural data types are stored in the mediate region, the data items can be obtained by the data type. These data items are stored in data types that are identifiable from each other. This procedure is clearly different from the disposition of information using conventional document editing application programs. This procedure is especially important to realize the reuse of temporarily or permanently stored information effectively.

[Data Type to be Received]

It is noted that data items of data types used by most of the application programs can be exchanged via the mediate region. Accordingly, one can realize the casual storage field that more application programs can use in common. Such data types include text (string), bit map, meta file, extended meta file, device-independent bit map, color palette, file address (path, for example), rich text, and so forth. The use of embedded object technology enables the casual storage field to receive and hold data of which data structure is more complicated than that of the ordinary data types listed above, and to hand over the data to other application programs. For example, graphs generated by a spread-sheet application program can be handled by the casual storage field.

[Displaying an Information Element]

Figure 14:
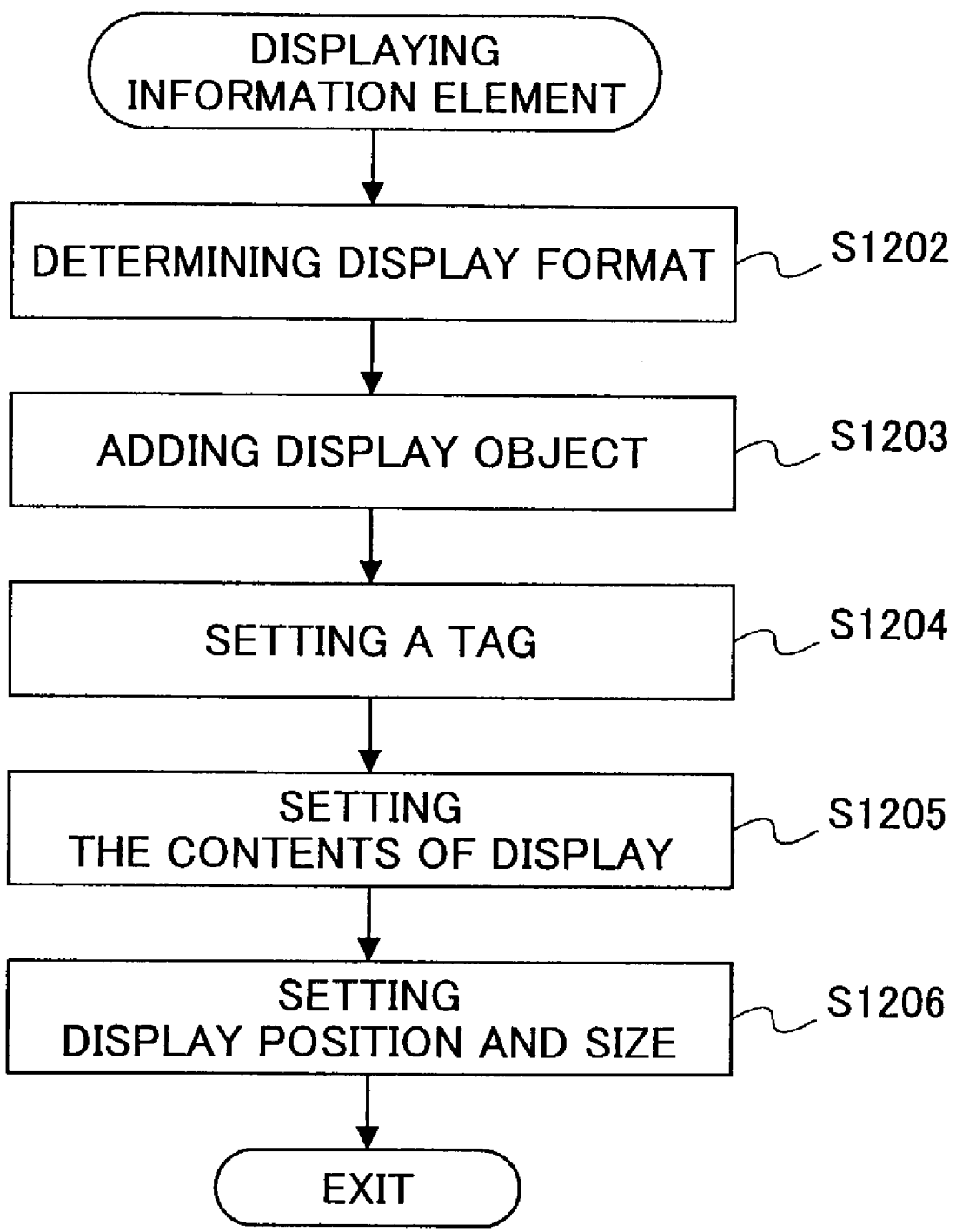
FIG. 14 is a flow chart for explaining a process of displaying an information element according to an embodiment.

FIG. 14 shows the process of displaying an information element. In S1201, display format is determined based on the stored data type. Since there are various data types, the contents of data need to be displayed in a manner in which the user can understand the contents of data at a glance. For example, it is desired to visually display the contents of data as is, instead of its name or icon. For example, it is better to display text data as text and image data as an image.

If an information element includes a file address such as a path as a data item, it is desired that the thumbnail of a document be stored in the file. The thumbnail is generated, for example, by displaying the document using the application program with which the document is generated, capturing a window image, and shrinking the window image.

If an application program such as Adobe Acrobat™ 5.0 having a function of generating a thumbnail is used, one can obtain the thumbnail of a document. If the thumbnail of a document is not available, the icon correlated to the document file can be obtained by querying the operating system.

In the above process of receiving an information element, when plural data items of different data types are received, it is necessary to select the display format of the information element from plural candidates of formats. That is, the data items of plural data types are not displayed in a casual storage field using display formats suitable to respective data items, but are displayed using a representative format. Even if there are plural data items of different data types, the user can easily understand the plural data items by indicating them using the representative format. The representative format is preferably a display format such as rich text, image, and meta-file, instead of text, with which the user can understand the data items more easily. When an information element including an image and text relating to each other is displayed, the rich text format and the meta-file format can express such relationship between the image and the text effectively and help the user understand the data items easily.

In S1202, display objects depending on the display format are added to the window of the casual storage field. When the display objects are implemented, controls such as a textbox and an image are used to provide user interface functions. In S1203, tags are set in the display objects to control the correlation with the information element. The tags make it easy to obtain an information element correlated to the display object and to hand over data, for example. In S1204, the attribute of the display object is set, and the contents to be displayed are designated.

In S1205, the size of the display object and the position of the display object are set. The size of the display object is determined in consideration of the entire region of the casual storage field so that the display does not become cluttered. For example, when an image requiring a large area needs to be displayed, the image is shrunk so as not to hide others. A new information element is displayed at the position where the information element is dropped to express the relationship between the user's operation and the new information element.

[Handing Over Data]

When the user designates an information element to be handed over and an application program to receive the information element, a process of handing over data is activated. The user is required, for example, to drag and drop the display object representing the information element from the casual storage field to the window of another application program. This operation is different from the above operation of moving an information element where an information element is dropped on the casual storage field, in that an information element is dropped on the window of another application program.

When data are handed over to another application program, the mediate region is used. In the process of handing over data, the data related to a designated information element are stored in the mediate region so that the application program to which the data are to be handed over can obtain the data. The application program can obtain a plurality of data items and information about their data types simultaneously by providing commands to the operating system in compliance with publicly available procedure.

Figure 15:
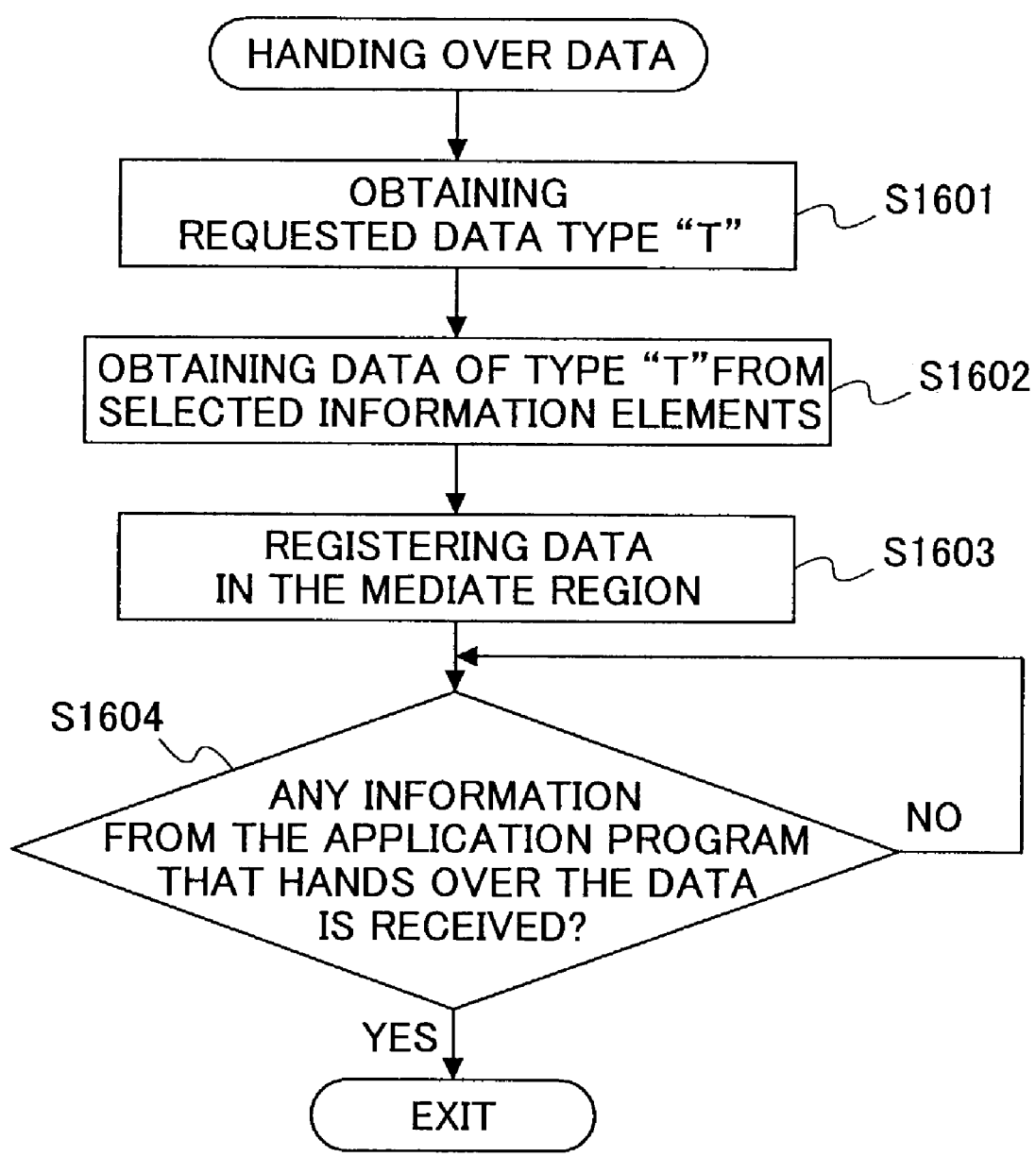
FIG. 15 is a flow chart for explaining a process of handing over a data item according to an embodiment.

FIG. 15 shows the process of handing over data. In S1601, in response to an event of requesting data provided by the application program, information of requested data types is obtained. In the following description, a data type "T" is assumed to be requested. As described previously, the requested data type is selected from the data types of which data are ready to hand over. After S1601, the data of the data type "T" are obtained from the stored information elements (S1602), and the data of the data type "T" are stored in the mediate region (S1603).

After a series of steps described above, the application program receives data accordingly and informs the casual storage field of the result. The casual storage field management unit waits for the information that the application program has successfully received the data (S1604). If the user's instruction is to move the information element, the selected display object is deleted in response to this information.

After the data are completely handed over to the other application program, the selected information element is cleared and the information element is discharged.

[Handing Over Plural Data Items of Different Data Types]

Corresponding to the selected information element, a plurality of data items having different data types may be stored in the casual storage field according to the present invention. All data items held by the information element need to be identified and stored in the mediate region. In the following description, it is assumed that the different data types are indicated "A", "B", . . . .

Figure 16:
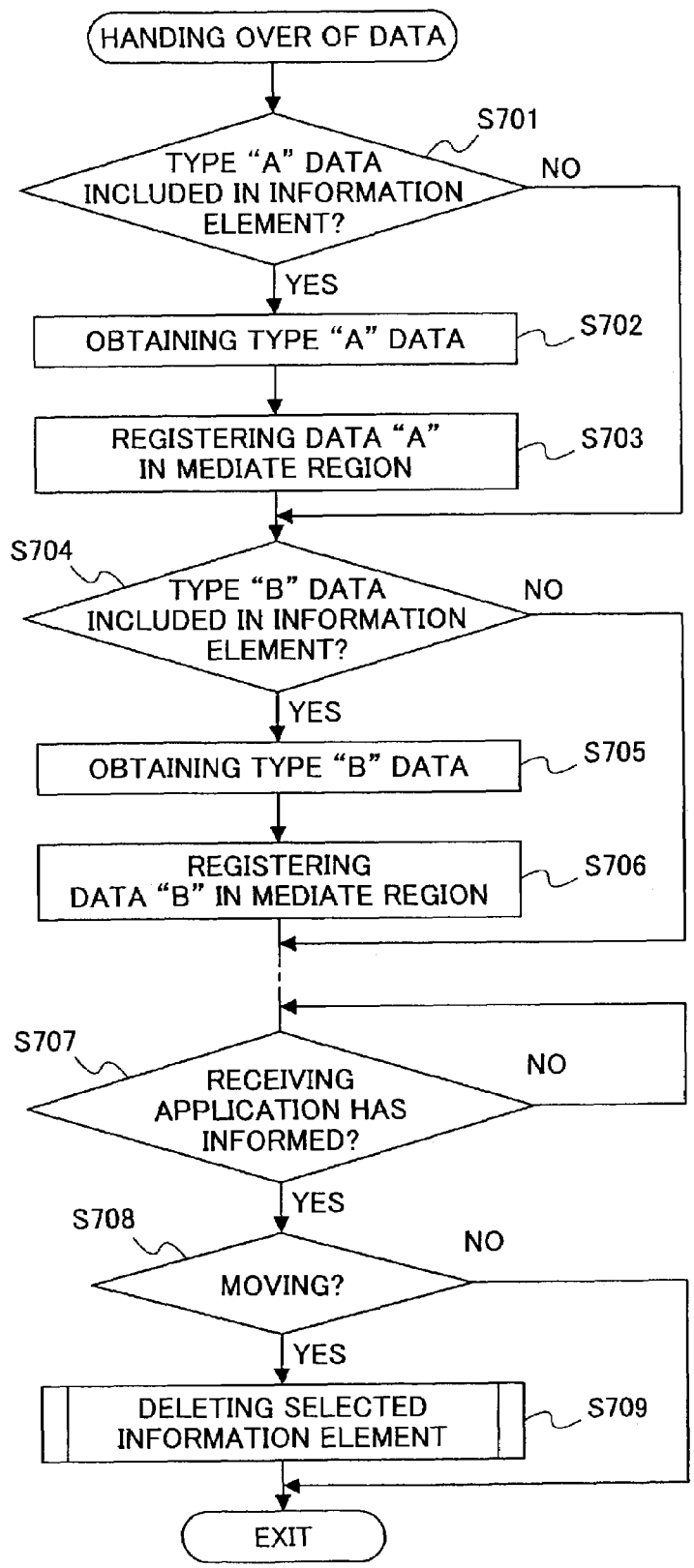
FIG. 16 is a flow chart for explaining a process of handing over data items of a plurality of different data types according to an embodiment.

In S701 of FIG. 16, it is determined whether the information element holds data items of data type "A" correlated to the information element. If a data item of data type "A" is held by the information element, the data item of data type "A" is obtained and stored in the mediate region (S702, S703). The same process is repeated for the data type "B" in steps S704 through S706. The same process is repeated for the other data types, if any.

An application program can exchange data with another application program using the mediate region in the following steps. In the first step, the application program registers only information related to the data types of data items to be exchanged with the other application program. In the second step, in response to a request provided by the other application program to which the data items are to be handed over (receiving application program), the application program stores the data items in the mediate region. In this case, the application program does not need to store data items that are not to be exchanged. Accordingly, the process becomes efficient.

After the above steps, the receiving application program receives the data items accordingly and informs the mediate region of the result of the receiving operation. The casual storage field management unit waits for the information that the receiving application program has successfully received the data item (S707).

The application program that hands over the data item (transferring application program), in response to this information, performs processing accordingly. For example, in the case where the user's instruction is to move the information element, the selected display object is deleted in response to this information (S708, S709).

The process of handing over an information element makes it possible to hand over data items correlated to respective information elements to another application programs through the mediate region.

[Obtaining Date and Time]

According to the method of managing the casual storage field of the present invention, the date and time at which the information element is stored in the casual storage field is obtained, and is correlated to the new information element. When the information element is temporarily or permanently stored in the casual storage field, the operating system is queried for the date and time, and the date and time are registered as the attribute of the new information element.

[Transforming Data Type]

A data type is transformed depending on the receiving application program.

For example, it is possible to generate image data based on text data or rich text data, and to generate text data based on an image including text. The text data can be extracted from the image by well-known character recognition processing. In addition, an image data item of a data type can be sometimes transformed into an image data item of another data type, and vice versa. For example, a bit map image can be converted into a JPEG image using a well-known technique; a full color bit map can be converted into a two-level bit map using another well-known technique.

As described above, a data item of a data type can be transformed into a data item of another data type and be handed over to another application program by combining a plurality of application programs according to conventional techniques.

In this case, however, the user needs to: store data in a file, activate an application program that transforms the data, cause the transferring application program to read and transform the file, store the transformed data, cause the receiving application program to read the transformed data, and so forth. The operation is not user friendly. In addition, the user needs to understand the data type of the data item to be transformed and the currently needed data type, and select an appropriate tool for the transformation, which is not easy at all.

On the other hand, according to the method of managing a casual storage field of the present invention, the system automatically determines the data item of which data type the receiving application program needs and transforms the data item accordingly. The user can operate the system easily without knowing the internal operations of the system.

When a data item is handed over to another application program, the data item may be transformed. Otherwise, the data item may be transformed before the data item is handed over.

Figure 17:
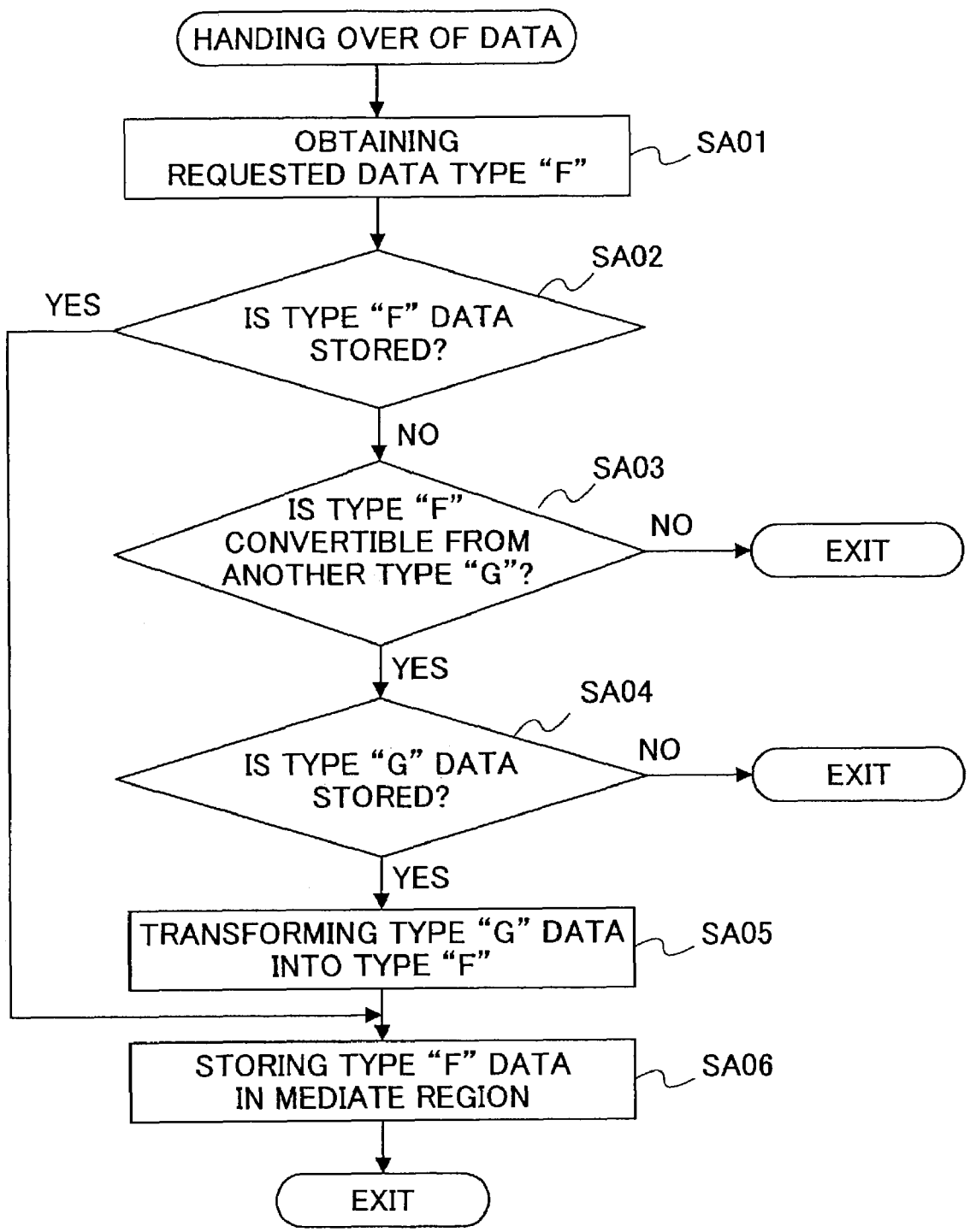
FIG. 17 is a flow chart for explaining a process of handing over a data item in which the data type of the data item is transformed into another, according to an embodiment.

In the former case, if a data item of a requested data type is not stored, a data item of another data type that can be converted to the requested data type is handed over to another application program via the mediate region (clipboard) as showed in FIG. 17.

The data type (referred to as "F" in the following description) requested by the receiving application program is obtained (SA01). It is determined whether a data item of the data type "F" is stored in the information element that is to be processed (SA02). If the data item of the data type "F" is stored in the information element, the data item is stored in the mediate region (SA06). The process is terminated.

If no data item of the data type "F" is stored in the information element, it is determined whether a data item of a different data type "G" can be converted into the data item of the data type "F" (SA03). If the conversion is not feasible, the process is terminated. If the conversion is possible, it is determined whether there is a data item of the data type "G" stored in the information element (SA04). If there is no data item of the data type "G" stored in the information element, the process is terminated.

If there is a data item of the data type "G" stored in the information element, the data item of the data type "G" is converted into the data item of the data type "F" (SA05). The conversion depends on the combination of the data type before the conversion and the data type after the conversion. For example, in the case where text is obtained from an image, the image is converted by character recognition processing. Finally, the data item of the data type "F" obtained by the conversion is stored in the mediate region (SA06).

Figure 18:
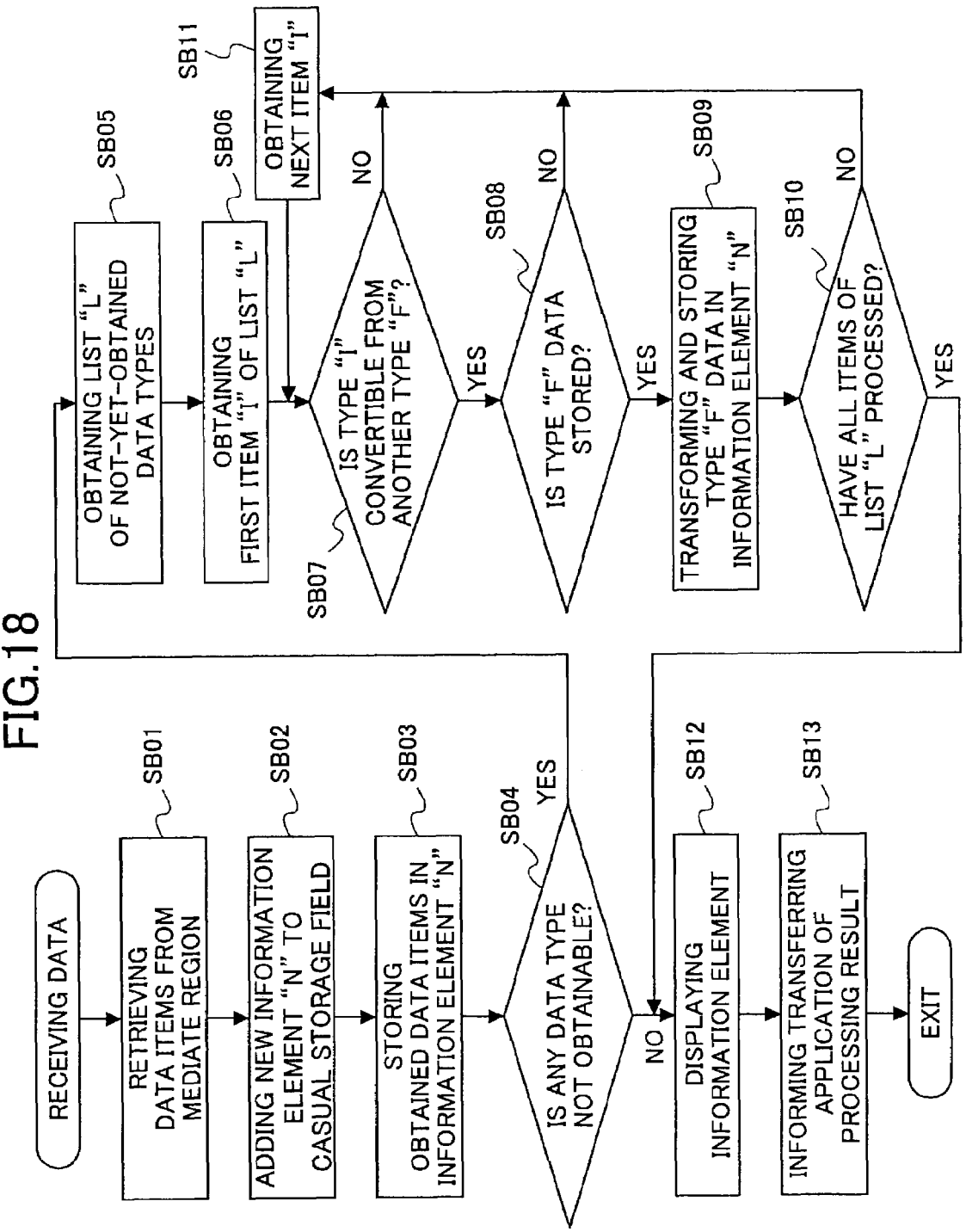
FIG. 18 is a flow chart for explaining a process of handing over a data item in which the data type of the data item is transformed into another before the data item is handed over to another application program, according to an embodiment.

In the latter case, that is, the case in which the data item is transformed before the data item is handed over, the data item is converted when the data item is received from another application program or afterwards at an appropriate timing (when the data item is stored, for example). FIG. 18 shows a process in which the data item is converted immediately after the data item is received.

The data items stored in the mediate region are obtained (SB01). A new information element is generated, and the obtained data items are stored therein (SB02). If no data item of a data type is stored in the mediate region and no data item of the data type is consequently obtained (SB04), a list of such data types is obtained (SB05). It is determined, for each one of the listed data types, whether there is any other data type that can be converted (SB07). If there is a data type that can be converted into one of the listed data types, it is determined whether there is a data item of the data type that can be converted into the one of the listed data types (SB08). If there is a data item of the data type that can be converted into the one of the listed data types, the data item is converted (SB09). The obtained data item is stored in the newly generated information element (SB10).

The step of transforming the data type (SB09) includes the following: extracting text from the image, transforming text into an image, and changing the data type of an image (from bit map to JPEG, for example). The transformation is executed using a publicly known method. The data obtained as a result of the transformation are correlated with the information element as the other data are, and are stored in the information element.

In this case, data items of all data types available through the transformation are obtained and stored in the information element. The efficiency of this process, however, may be degraded since the transformation is executed for the data types of which data items are not handed over.

[Opening a Document]

Documents linked to an information element are opened by executing file activation processing provided by the operating system, for example. Microsoft Windows 2000™ can correlate files with specific application programs and can manage the files correlated with the specific application programs. Once the path of the file of a document is designated, the application program correlated with the file can be activated to display the document.

[Switching a Plurality of Casual Storage Fields]

According to a method of managing a casual storage field of the present invention, it is possible to generate plural casual storage fields in each of which different sets of information elements can be retained in a manner in which the information elements can be identified from each other. The user can select one of the casual storage fields depending on the user's requirement. Each casual storage field may be named, and the names of the casual storage fields may be shown to the user in a list. Each of the casual storage fields may be shown in the form of a shrunken image, for example. Such a shrunken image may be generated by capturing the screen of the casual storage field.

In response to the user's selection of one of the casual storage fields, the system displays the selected one of the casual storage fields. In the case where the casual storage fields are exclusively switched, the other ones of the casual storage fields (casual storage fields that are not selected) may be closed or showed in a shrunken form to promote screen efficiently. Of course, plural casual storage fields that are selected by the user may be displayed on the screen simultaneously.

[Transition of States]

An apparatus for managing a casual storage field according to the present invention has a state parameter to indicate the state of the apparatus that changes in accordance with the user's operation. When the state is changed, the state parameter is changed. In response to detection of the user's operation, the system determines its operation in accordance with the state parameter.

Figure 19:
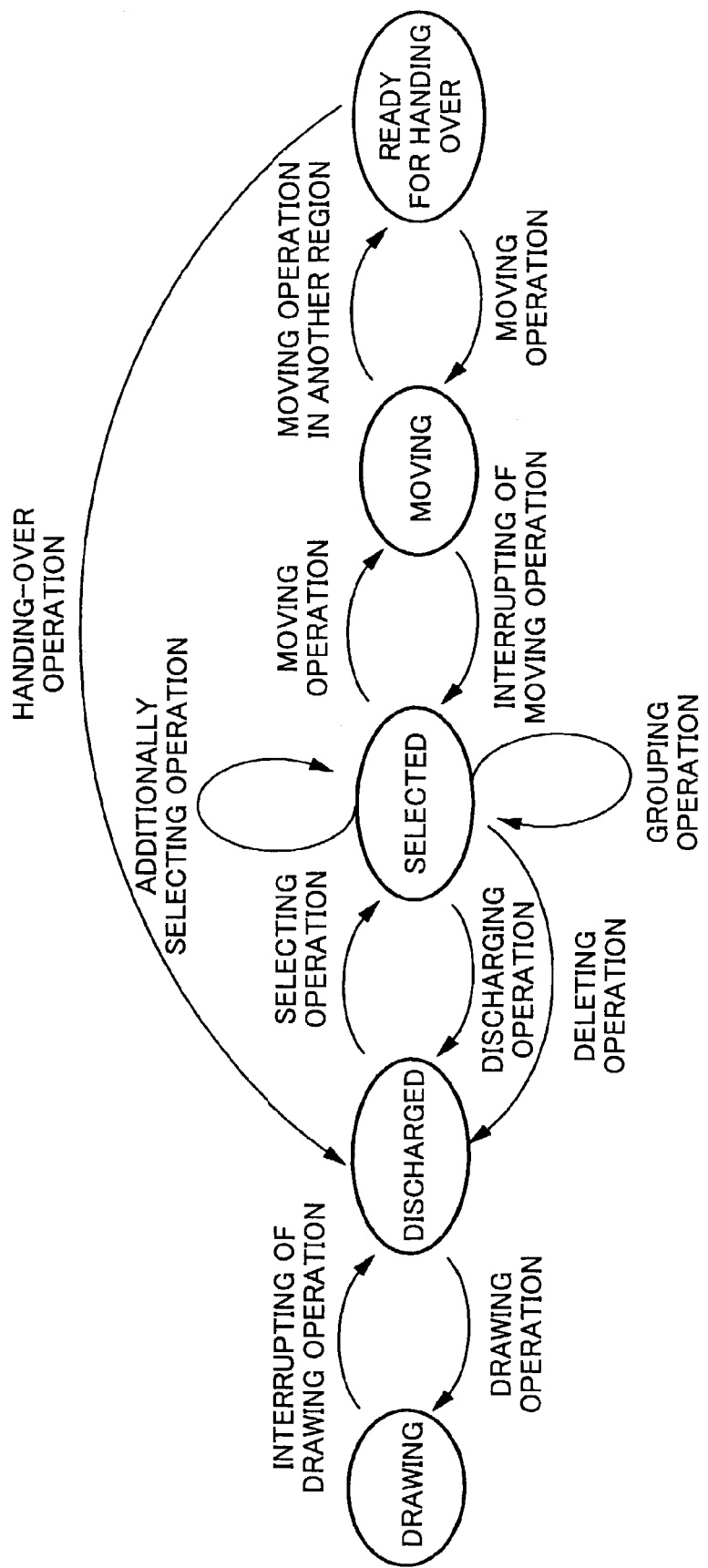
FIG. 19 is a state transition diagram according to an embodiment.

FIG. 19 is a schematic diagram showing state transition of the apparatus for managing a casual storage field according to the present invention. Each oval indicates a state, and each arrow indicates a transition.

[Selecting Process]

In the case of a method of managing a casual storage field according to the present invention, the display position of a selected information element can be moved in response to an operation of the user. In a discharged state, when a user selects an information element and the user's operation is detected, the casual storage field transits to a selected state. The selected information element is stored as selected (selecting process). For example, while the pointer is within a display region of an information element, the information element is selected by clicking a button of the mouse (or by touching the display region with a pen), for example. The selected information element is identified with a data item such as an information element ID, the data item that can uniquely identify the selected information element registered in the casual storage field. The selected information element may be emphasized by changing the color of its envelope. In the selected state, when another information element is selected, the information element previously selected is discharged, and the other information element that is newly selected is stored as selected.

[Moving Process]

When the apparatus detects that the user moves the information element by moving the pointer with the button of the mouse being pressed in the display region of the selected information element (dragging), for example, the apparatus transits to the moving state. The moving of the information element can be performed in a series of steps smoothly.

Figure 20:
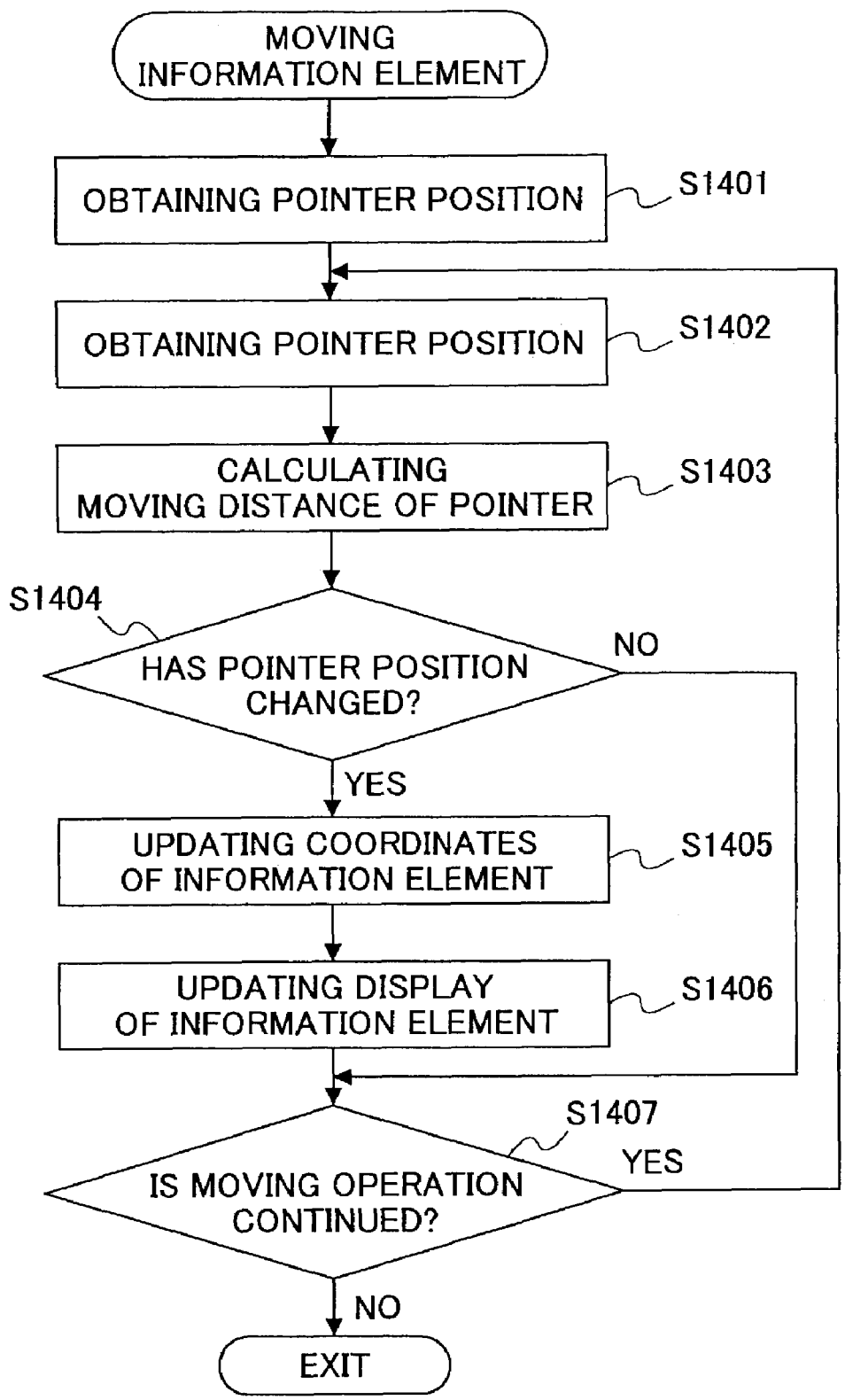
FIG. 20 is a flow chart for explaining a process of moving an information element according to an embodiment.

In the moving state, the coordinates of the pointer are detected and stored one after the other. The display position of the information element is changed (moving process). FIG. 20 shows the process of moving an information element. In S1401, the initial value of the pointer position is obtained from the coordinate input unit. In S1402, the next pointer position is obtained. In S1403, the moving distance of the pointer is calculated based on the two pointer positions obtained above. If it is determined that the pointer position has changed in S1404, the position of the information element is updated (display coordinates of FIG. 5). In S1406, the information element is displayed at the newly set coordinate position. If it is determined that the pointer position has not changed, the position at which the information element is displayed is not changed. In S1407, it is determined whether the moving operation continues by checking the state of the mouse button or the pen position. If the moving operation is completed, the moving process is terminated. If the moving operation still continues, the next pointer position is determined, and the information element is moved repeatedly in the same manner.

In the case where the updating of the display position of the information element requires so long a time that the information element cannot be showed naturally, a rectangle representing the envelop of the information element may be moved instead of moving the information element itself. As a result, the work load on the system is reduced, but the user can see that the information element actually "moves" in response to the user's operation. When the moving operation is completed, the display position of the information element is updated.

When the apparatus detects that the user suspends the moving operation, the display position of the selected information element is determined, and the apparatus transits to the "selected" state. The moving operation is suspended, for example, by releasing the click button (or raising the pen), for example, in the display region of the casual storage field. In this case, the user cannot perform a different operation without suspending the moving operation.

If an information element is moved to a casual storage field, and a portion of the information element sprawls out of the casual storage field, the user may lose the information element. To avoid this problem, the upper left corner point of the information element is required to stay within a box of which corner points are at (0,0), (0,H-h), (W-w,0), and (W-w,H-h), where "w" and "h" are the width and the height, respectively, of the moved information element and "W" and "H" are the width and the height, respectively, of the range in which the moved information element can be displayed. Accordingly, the information element can be definitely displayed within the display region of the casual storage field.

In addition, when the information element is moved to a designated position, the moved information element may hide another information element. To avoid this problem, if the user designates such a position at which the moved information element, if moved, hides the other information element, the apparatus automatically adjusts the position at which the moved information element is placed so that the moved information element does not hide the other information element. As a result, the user does not lose any information element.

A virtual lattice of constant pitch, lengthwise and widthwise, may be provided in the display region of a casual storage field, and the information elements may be placed only on crossing points of the virtual lattice so that the user can arrange the information elements easily and can make the casual storage field look nice.

[Discharging from Selection]

When the apparatus detects the user discharging a selected information element in the "selected" state, the data item that is held by the selected information element is cleared, and the apparatus transits to the "discharged" state. The discharging operation is, for example, to click the mouse button at a position other than the region of display object of the information element but in the display region of the casual storage field. Since the "discharged" state is provided, a user's operation to an object other than the information element can be easily defined, which makes the design more flexible. When the information element transits to the "discharged" state, the display of the information element, if it still indicates the information element is selected, is restored to an ordinary one.

[Deleting an Information Element]

When the apparatus detects the user's detecting operation, it deletes the information element, and then, transits to the "discharged" state. The deleting operation is, for example, to press the "Delete" key of the keyboard in the "selected" state.

Figure 21:
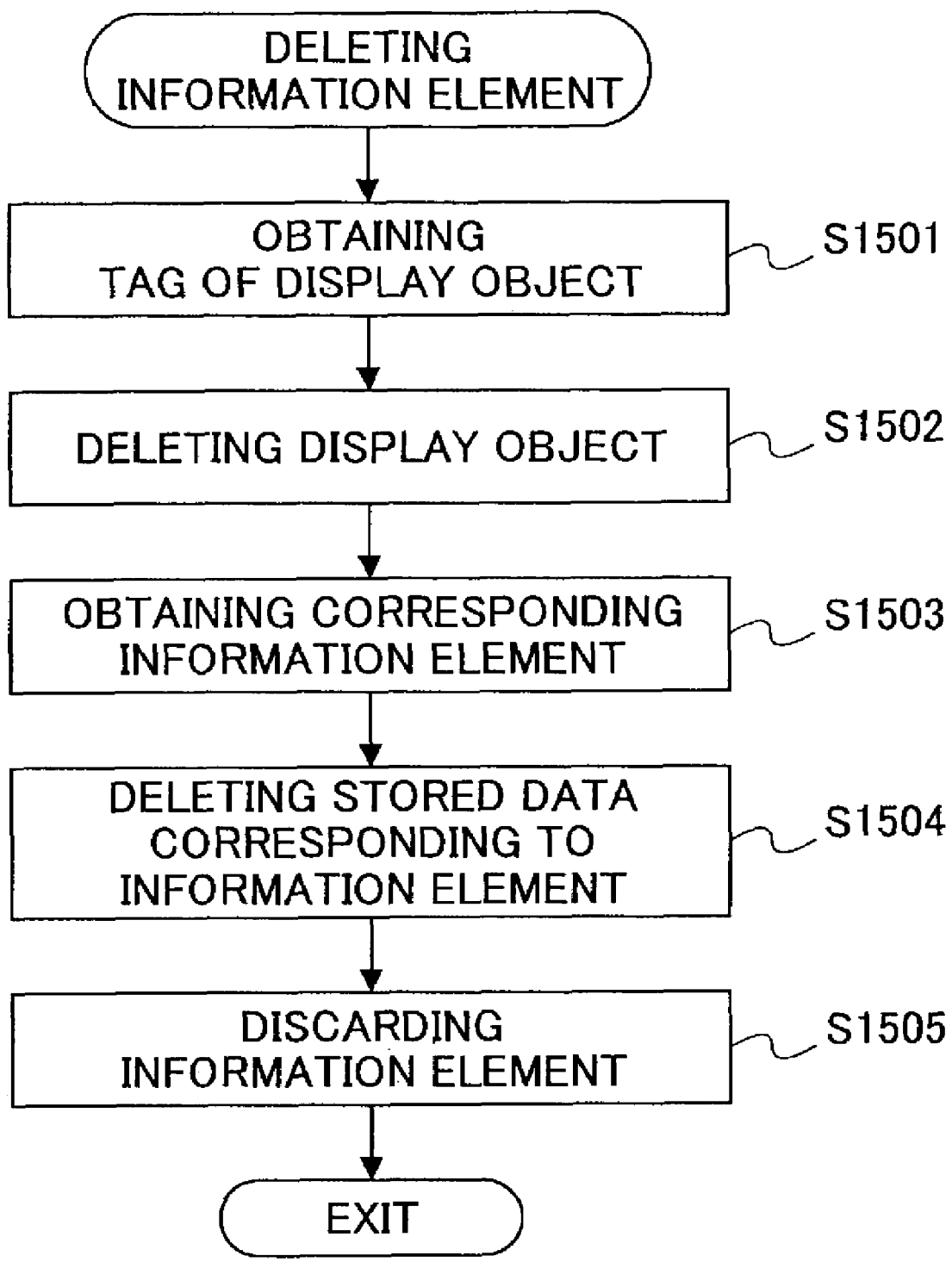
FIG. 21 is a flow chart for explaining a process of deleting an information element according to an embodiment.

FIG. 21 is a flow chart showing a process of deleting an information element. When the information element is deleted, data items that are correlated with the information element and are stored with the information element are also deleted (S1504). If the address of a file is included in the data items to be deleted with the information element, only the data item indicating the address of a file is deleted, and the file itself is not deleted since the user may need the file for other purposes, for example.

["Ready for Handing Over" State]

The information elements that are designated by the user are handed over to a designated application program in response to the user's operation.

When the information element is dragged up to the window region of another application program, the information element transits to a "ready for handing over" state. The types of data items that can be handed over to the other application program are registered in the mediate region. The moving operation described above is not performed. If a plurality of data items of different data types are correlated to the information element, all the different data types are registered in the mediate region. The application program retaining the window up to which the information element is dragged (receiving application program) determines data items of which data types can be handed over by reading the data types registered in the mediate region, and selects the data types to be handed over. The application program determines whether there is a data item of the selected data type. The application program can indicate whether the data items can be handed over by changing the display of a mouse cursor.

As described above, only information about the data types of which data items can be handed over is registered in the mediate region until the receiving application program requests that the data items of the data types be stored in the mediate region. Data items that do not need to be stored in the mediate region are not stored in the mediate region, which increases the efficiency of processing.

If the information element once dragged up to the display region of the other application program is further dragged up to the display region of the casual storage field, the information element transits to the "moving" state in which only the display position of the information element is moved.

[Selecting Plural Information Elements]

According to a method of managing a casual storage field of the present invention, a plurality of information elements can be selected simultaneously. That is, when an information element is selected (in the "selected" state), the user can additionally select another information element by selecting the other information element with a specific key (Shift key, for example) pressed. A data item that is retained in the selected information elements may be any data item that can uniquely identify a plurality of information elements from one another.

Figure 22:
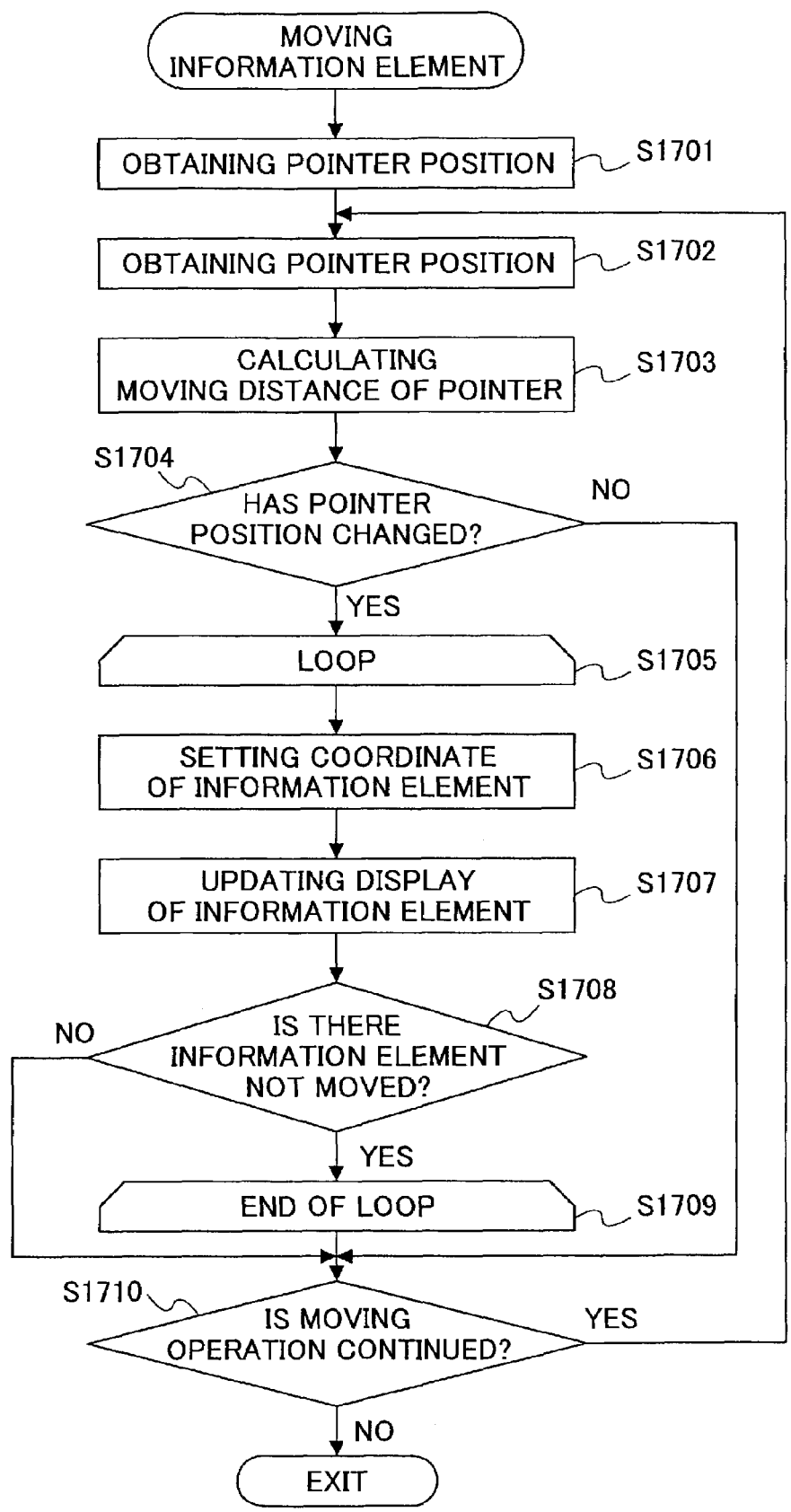
FIG. 22 is a flow chart for explaining a process of moving a plurality of information elements according to an embodiment.

In the "moving" state, the display position of the plurality of information elements are moved in response to the move of the pointer. FIG. 22 shows a flow chart of this procedure. Since steps S1701 through S1704 are identical to the steps S1401 through S1404 of FIG. 20, a description of the steps S1701 through S1704 is omitted. When it is determined that the pointer position has been changed in S1704, the steps within a loop indicated by S1705 through S1709 are executed. Steps S1706 and S1707 are identical to the steps S1405 and S1406 of FIG. 20 in which the display positions of the selected information elements are updated. In S1708, it is determined whether there remains such any information element that is selected but has not been moved. If it is determined that there still remains an information element, the steps S1706 and S1707 are repeatedly executed for each of the remaining information elements. If all the selected information elements are completely moved, it is determined that there remains no information element to be moved in S1708, and the system exits from the loop. In S1710, it is determined whether the moving operation still continues. If the moving operation is still continuing, the next pointer position is obtained, and the moving process is repeated. If it is determined in S1710 that the moving operation has been completed, the moving process is completed and the system transits to the "selected" state.

When the system transits from the "selected" state in which a plurality of information elements are selected to the "discharged" state, all data items retained in the selected information elements are cleared.

[Grouping]

The method of managing a casual storage field according to the present invention includes, so as to classify a plurality of information elements into groups, the following steps of: defining an information element group, registering designated information elements in the information element group, and deleting a designated one of the information elements registered in the information element group. The information element group is an object that can include an information element as a member.

A new information element group is generated in response to detection of the user's grouping operation (the step of defining an information element group). The operation of generating an information element group is to select an item from a pull-down menu and to click a specific region (or a button) in the screen, for example. The generated information element group is displayed in a rectangular box in the display region of the casual storage field.

Next, in response to the user's operation of adding an information element to the information element group, a designated information element is registered in the designated information element group as a member (the step of adding an information element to an information element group). The operation of adding an information element to an information element group is to drag and drop the information element into the display region of an existing information element group.

Since the user can designate a member of the information element group and delete it, the user can easily and flexibly generate an information element group as desired. The user may select an information element out of the information element group members and drag & drop the selected information element out of the display region of the information element group. The selected information element is removed from the information element group members (the step of deleting an information element from an information element group).

Figure 23:
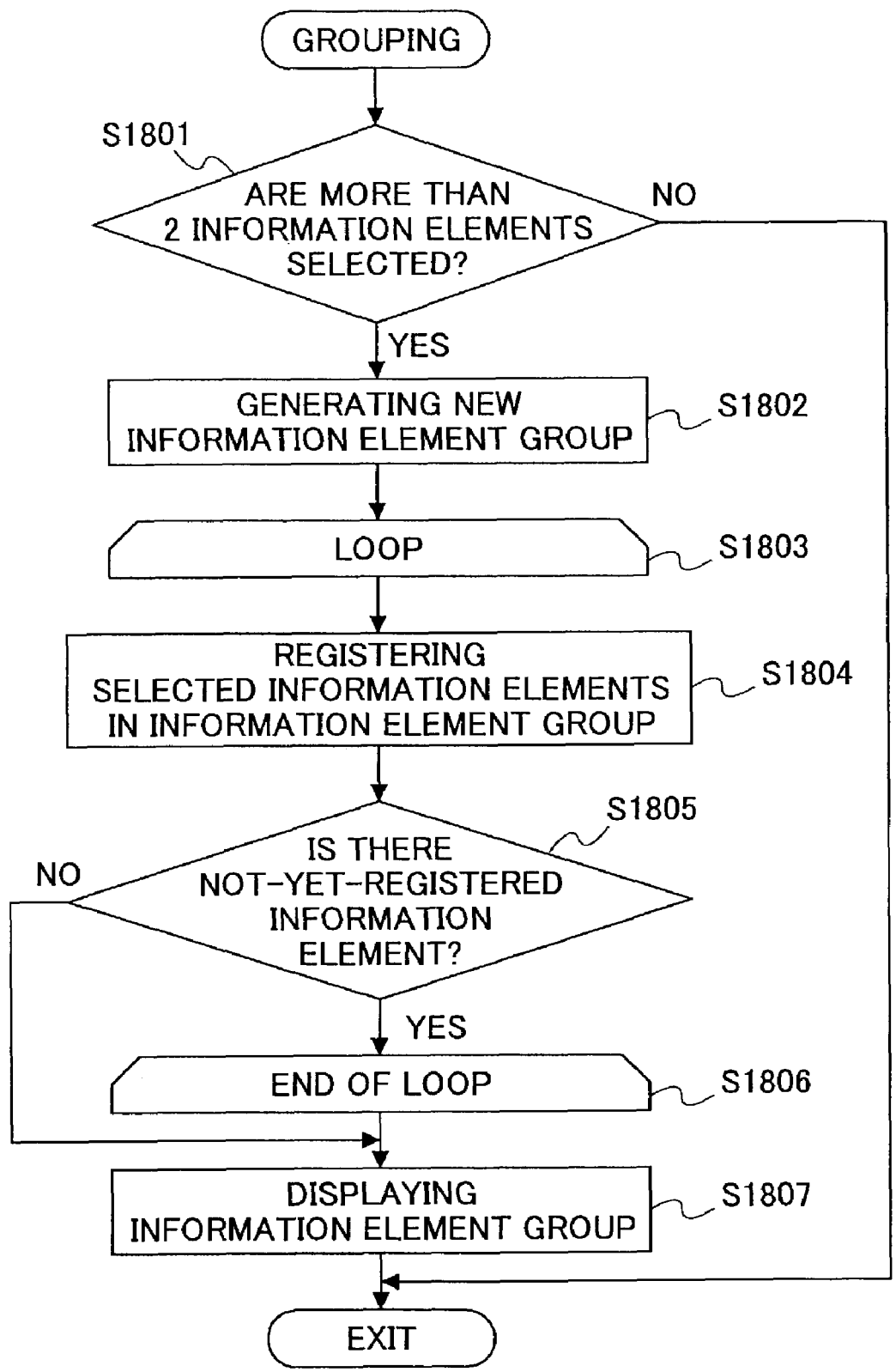
FIG. 23 is a flow chart for explaining a process of grouping information elements according to an embodiment.

The generation of an information element group and the registration of information elements to the information element group may be related to a single operation of the user. For example, when the user selects a plurality of information elements, and gives the system an instruction to form a group for the information elements by selecting an item from the pull-down menu, for example, the system may generate a new information element group and register each one of the selected information elements as a member of the new information element group. FIG. 23 is a flow chart showing the above procedure.

Likewise, it is possible to relate the arranged display and the grouping as provided by VIKI described above. That is, if the user arranges a plurality of information elements in a row or in a column, the system may regard the arrangement as a grouping operation.

The information elements registered to an information element group are displayed in the display region of the information element group. Each one of the information elements included in the information element group may not be displayed (that is, only the existence of the information element group is indicated) so as to simplify the display region and make it easy to understand. Even in this case, however, it is necessary to provide a function in which the user can review the members and delete a designated member, if necessary, for the convenience of operation.

When the user clicks the mouse button while the mouse pointer is in the display region of the information element group (or pen down, for example), the information element group is selected and retained. When the information element group is selected, all the members included in the information element group are selected. When the information element group is selected and the selected information element group is moved, deleted, or handed over to another application program, the operations are executed for all the members included in the information element group.

[Hierarchy of Information Element Groups]

According to a method of managing a casual storage field of the present invention, an information element group may be registered in another information element group as a member. Accordingly, the user can define a multi-layered information element group.

For example, the user can select an information element group, and drag & drop the selected information element group into an existing information element group. In this case, the selected information element group is registered as a member of the existing information element group.

The user may select an information element group and another information element group, or an information element, and give the system an instruction to form a new information element group including them. The system generates a new information element group and registers the selected information element groups, or the selected information element groups as the members of the new information element group.

An information element group retains its members with information that uniquely identifies the registered information elements and the registered information element groups.

[Moving an Information Element Group]

According to a method of managing a casual storage field of the present invention, one can select an information element group and move the display position of the information element group by the moving process. When the user selects the information element group, the system determines, in response to the user's operation, that the input coordinate is within the display region of the information element group and retains the information element group as a selected one.

The process of moving the selected information element group is the same as the process of moving an information element. As showed in FIG. 6, in the case where the coordinate is stored as the data item indicating the information element group, the display coordinates are changed in accordance with the move.

[Drawing]

Figure 24:
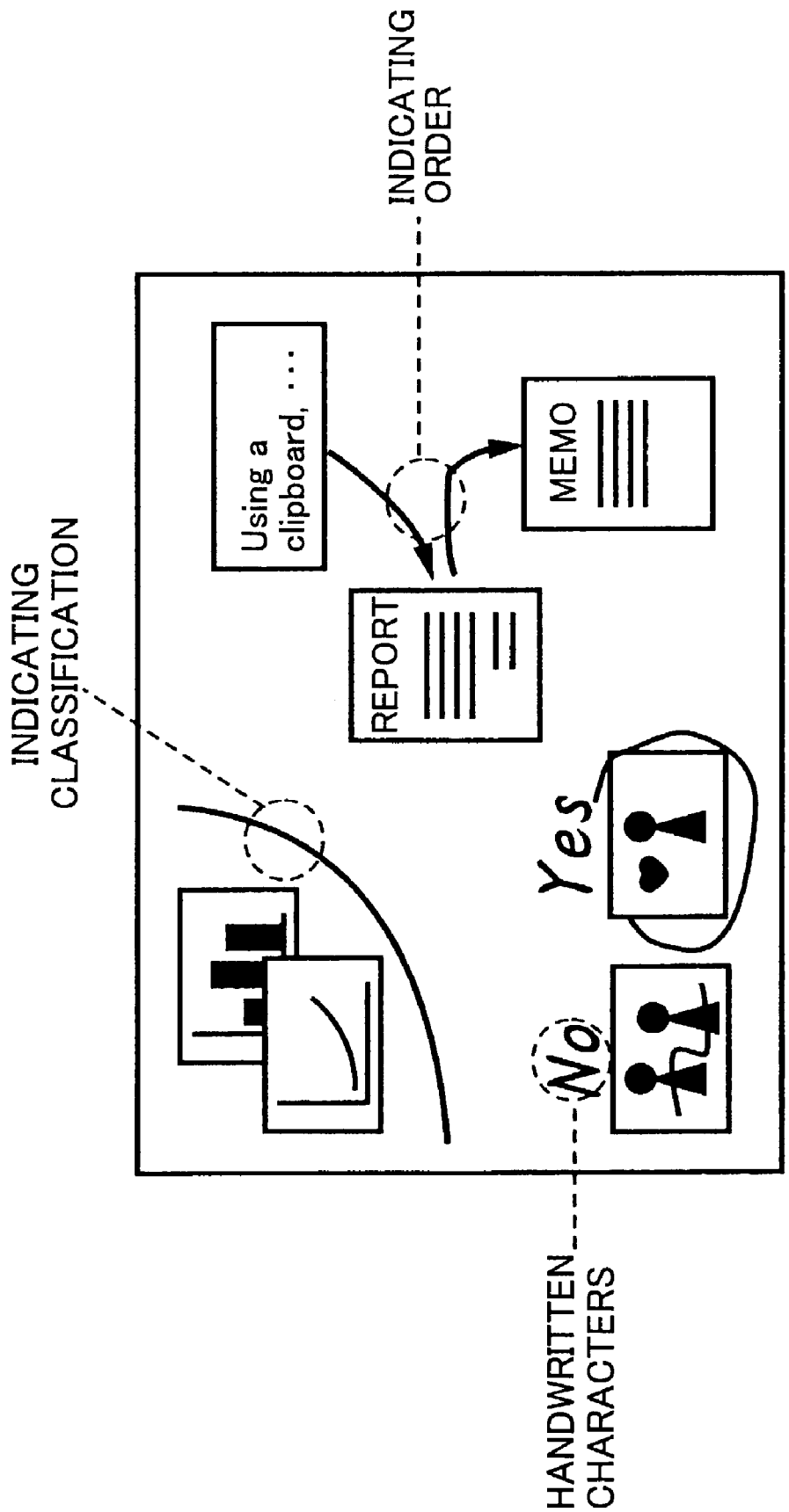
FIG. 24 illustrates a casual storage field displayed on a screen in which drawing elements are displayed according to an embodiment.

The method of managing a casual storage field according to the present invention includes a step of drawing, and enables the user to add drawing information to the casual storage field. Since the user can draw lines and arrows, for example, the user can classify the information items, compare the information items, and indicate the order or the causal relationship between the information items disposed in the casual storage field. The user can further add hand written drawings and characters in the casual storage field. As showed in FIG. 24, there are various types of lines such as a straight line, an arc, a rectangle, and a free curve. Especially, the user can use the free curve flexibly and usefully to achieve the above purposes.

Figure 25:
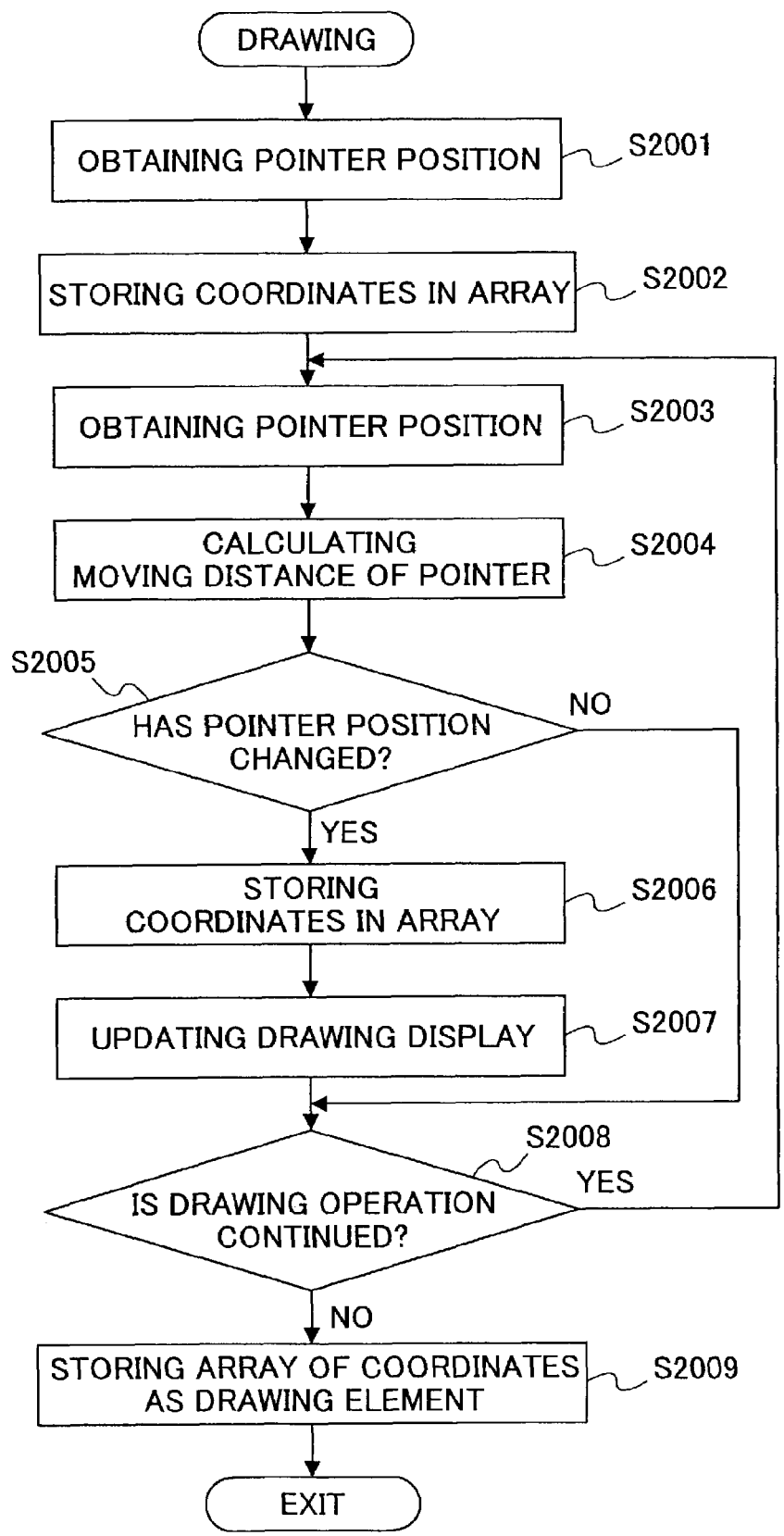
FIG. 25 is a flow chart for explaining a process of drawing according to an embodiment.

The procedure of drawing a free curve, for example, will be described below by reference to FIG. 25. In the "discharged" state, when the system determines the user's drawing operation, the system transits to a "drawing" state. This operation is, for example, a click & drag operation at a position that is not in the display region of an information element in the casual storage field in the "discharged" state. In the "drawing" state, the coordinate data input through the pointing device are retained one after the other, and a curve binding the coordinates is displayed.

First, the initial value of the pointer position input from the coordinate input device is obtained (S2001), and is stored as the first element of an array (S2002). In S2003, the next pointer position is obtained. In S2004, the moving distance of the pointer is calculated based on these two pointer positions. In S2005, if it is determined that the pointer position has changed, the pointer position obtained in S2006 is stored as an element of the array. In S2007, a curve is showed based on a series of coordinates stored in the array.

Bezier curve is one of well known methods to draw a free curve. The Bezier curve determines pixels of a curve by regarding the series of coordinates as control points. In addition, it is possible to draw a smooth curve on a multi-level display device using a well-known anti-alias method. If a series of coordinates are connected with straight lines, display processing becomes easy and fast. If the drawing information input by the user is captured at a high sampling rate, a relatively smooth curve can be drawn with this method.

If it is determined that the pointer position has not changed in S2004, the steps S2005 and S2006 are skipped. In S2007, it is determined whether the drawing operation is continuing by examining the state of the mouse button and the position of the pen. If the drawing operation has been completed, the series of coordinates stored in the array are arranged in the data format of a drawing element showed in FIG. 7 and registered. Then the drawing process ends.

If the drawing operation still continues, the next pointer position is determined (S2002), and the above steps are repeated in the same manner. If the system determines that the user has suspended the drawing operation, the system transits to the "discharged" state. This operation is, for example, to release the button of the mouse (or raise the pen up) in the "drawing" state.

The series of coordinates then stored are retained as a drawing element (FIG. 7). An ordinary relational database, an ordinary file system, and so forth are used in order to store the drawing element. The coordinate data can be stored in parallel with the drawing process. In this case, the drawing process is required to follow and react to the user's drawing operation promptly.

[Moving of a Drawing Element]

According to the method of managing a casual storage field of the present invention, a drawing element can be selected, and the display position of the selected drawing element can be changed using a moving process. When the user selects the drawing element, the system determines that the input coordinates are within the display region of one of the drawing elements and retains the drawing element as a selected one.

The process of moving a drawing element that is retained as a selected one is the same as the process of moving an information element described above. As showed in FIG. 7, in the case where absolute coordinates of the display region of the casual storage field are stored as data items indicating the drawing elements, the moving distance is added to each value of the X-coordinate and the Y-coordinate.

[Storing and Restoring]

The information related to the casual storage field is stored in the format such as a record of a database and a file, for example. The element information disposed in the casual storage field is also stored in a format such as the record and the file, for example, by the data type.

When the information related to the casual storage field is read and restored, all information elements, information element groups, and drawing elements such as straight lines and curves are showed in the process of displaying the casual storage field.

[Embodiments]

Figure 26:
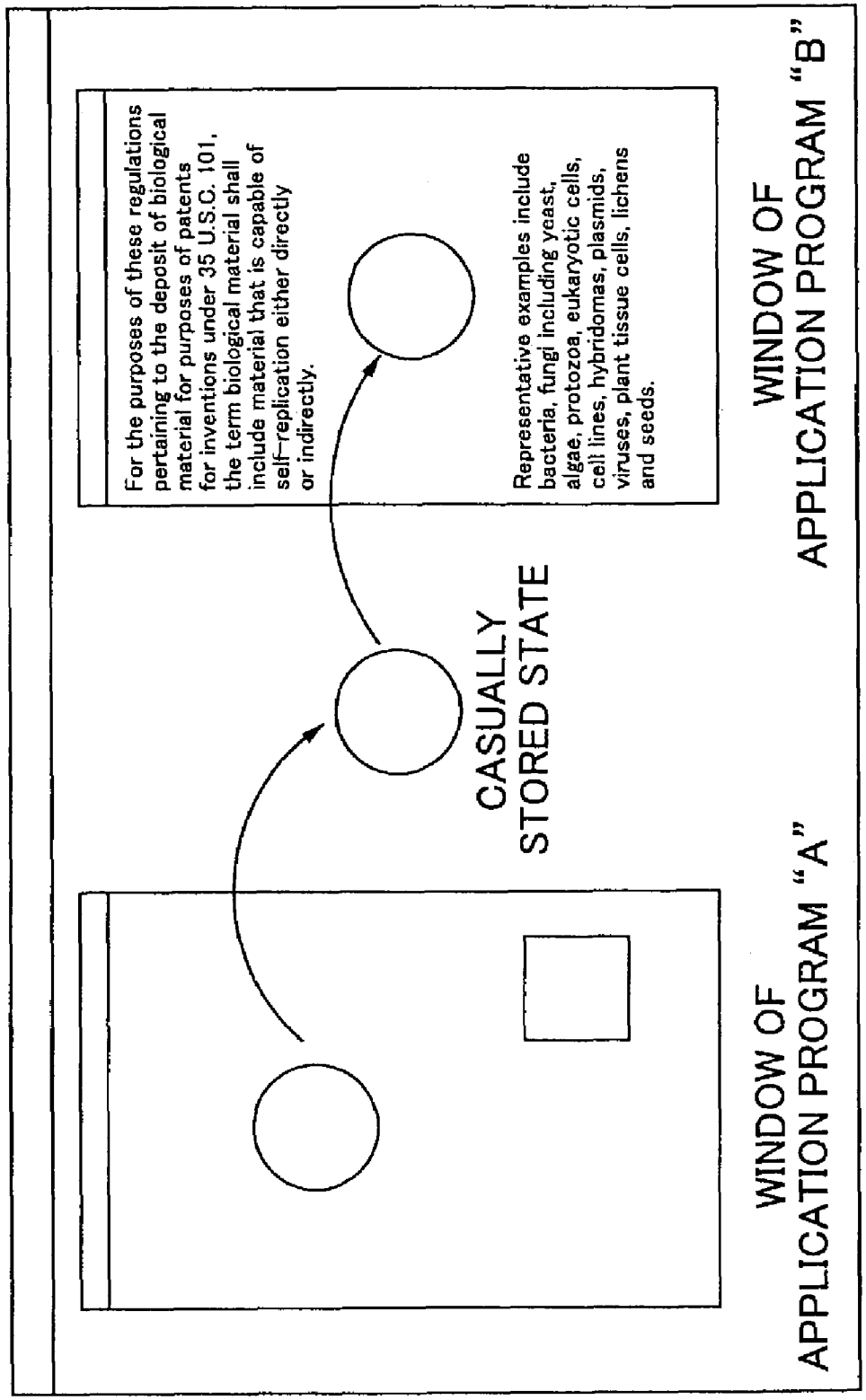
FIG. 26 is a schematic diagram for explaining an embodiment.

FIG. 26 is a schematic diagram for explaining the receiving and the handing over of an information element.

One can select a drawing included in an existing document (document A) and dispose the drawing in the casual storage field using the method of managing a casual storage field according to the present invention. The user selects the drawing, and moves the drawing to the window of the casual storage field by a drag & drop operation. The application program displaying the document A (application program A) stores the data related to the selected drawing in the mediate region using an arbitrary format. The data may include data items of a plurality of data types such as bit map, WMF, and text (including the drawing). An application program that realizes the casual storage field executes the process of receiving data showed in FIG. 11 in response to an event in which an object is dropped on the display region of the casual storage field. The display of the drawing is added to the casual storage field, and data items of plural data types stored in the mediate region are correlated with the drawing and are retained.

In the case where the user inserts the drawing into a document generated using another application program (application program B), the user is required to select the drawing and move the selected drawing to the window of the application program B. In this case, the application program that realizes the casual storage field detects an event wherein the user starts dragging, and performs the process of handing over data showed in FIG. 16. As showed in FIG. 16, in the case where data items of a plurality of data types related to the selected drawing are stored, the data items are stored in the mediate region. The application program B, in response to the event where the user performs a drop operation, receives data items from the mediate region and lays them out in the active document. In the case where data items of a plurality of data types are stored in the mediate region, the receiving application program (the application program B, in this case) determines data items of which data type to receive and inserts them in the document based on the specification of the receiving application program. The data items of the data types that the application program B processes at a priority are processed.

In the case where data items are moved from the casual storage field and stored in the mediate region, only data items of a specific data type may be stored. To realize this function, when the user hands over data from the casual storage field to another application program, the user selects, from a pop-up menu, for example, the specific data type that the user desires to hand over to the mediate region. The application program that realizes the casual storage field stores, in the mediate region, only data items of the designated data type that are related to the element (figures, for example) stored in the casual storage field. Accordingly, it is possible to hand over only data items of desired data types from the casual storage field to the application program B.

The method of managing a casual storage field in which the casual storage field is correlated with a designated region will be described below.

It is difficult to implement a function to obtain the file name of documents generated and displayed using various application programs. On the other hand, the title of a window can be easily obtained by using the application program interface (API) provided by the operating system. The title of a window often includes information related to the title of a document. Accordingly, when the corresponding relationship between a document and the casual storage field is to be registered, the system obtains the title of the window in which the document is displayed, and the title of the window (string) and the casual storage field ID are correlated with each other and retained. An ordinary method of managing data such as a relational database is used for the storage. FIG. 27 illustrates a table retaining the window title and the casual storage field ID correlated with each other. If a new corresponding relationship needs to be added, a new record will be added to this table.

[Correlating Operation]

The operation in which the user correlates a casual storage field with a window will be referred to as "correlating operation". The user interface of the correlating operation may be easily realized in the following manner. The titles of currently displayed windows are listed and showed to the user. Then, the windows selected by the user are correlated with a casual storage field. In this case, a user interface object such as a menu item, with which the user enters the correlating operation, may be provided in the display window of the casual storage field.

In this case, however, the user interface object such as a menu item is provided in the casual storage field, not in the window that the user desires to be correlated with the casual storage field. The location of the user interface object may confuse the user. Additionally, when the user correlates a casual storage field to the window, the window needs to be displayed on the screen. The user may not be familiar with such a restriction.

This problem can be solved by the method of managing a casual storage field according to the present invention. To make the user interface of the correlating operation intuitively easy to understand, it is beneficial to provide a user interface object such as a menu in the window to be correlated as an entrance to the correlating operation.

Figure 28:
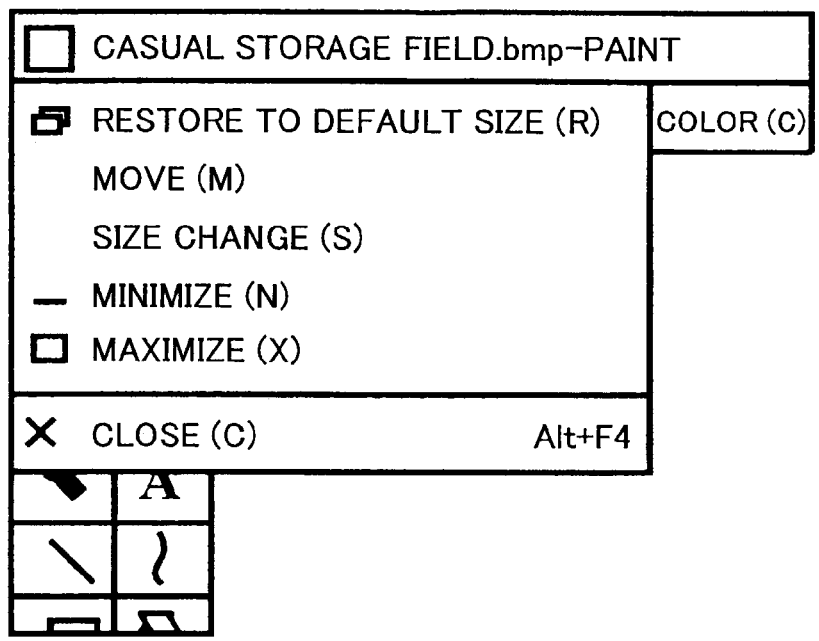
FIG. 28 is a schematic diagram for explaining a system menu.

The window that displays a document and so forth is generally provided with a region called "title bar". This title bar is provided with pull-down menus that are displayed by clicking. This pull-down menu includes menu items with which the user gives the system an instruction of operation such as the closing of the window and moving. This pull-down menu will be referred to as a "system menu". FIG. 28 illustrates a title bar with the system menu displayed.

Figure 29:
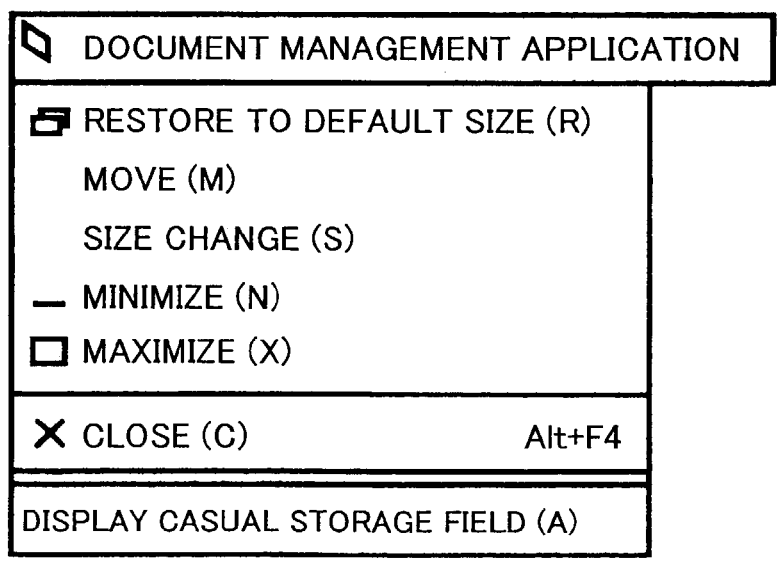
FIG. 29 is a schematic diagram for explaining a system menu according to an embodiment.

New items are added to the system menu of a window displaying a document and so forth using the API provided by the operating system. Microsoft Foundation Class (MFC) library is provided as a basic framework of software that runs on Microsoft Windows™. MFC provides a system menu as a standard user interface related to the control of the state of windows. The system menu is a pull-down menu displayed at the upper left corner of the window. The system menu accompanies the windows of various application programs as far as the windows comply with the specific format. In other words, if the user interface is provided through the system menu, it is possible to provide a standard operation for windows of different application programs. The items to be displayed in the system menu can be edited, if necessary. A number of books deal with how to edit the system menu. The system is set so that, when one of additional menu item is selected, the correlating operation is activated. FIG. 29 illustrates the system menu in which a menu item of the correlating operation ("displaying casual storage field") is added.

[Displaying Correlated Casual Storage Field]

When the user performs the correlating operation, the apparatus for managing a casual storage field according to the present invention correlates the window with the casual storage field (correlating process) and display the casual storage field.

Figure 30:
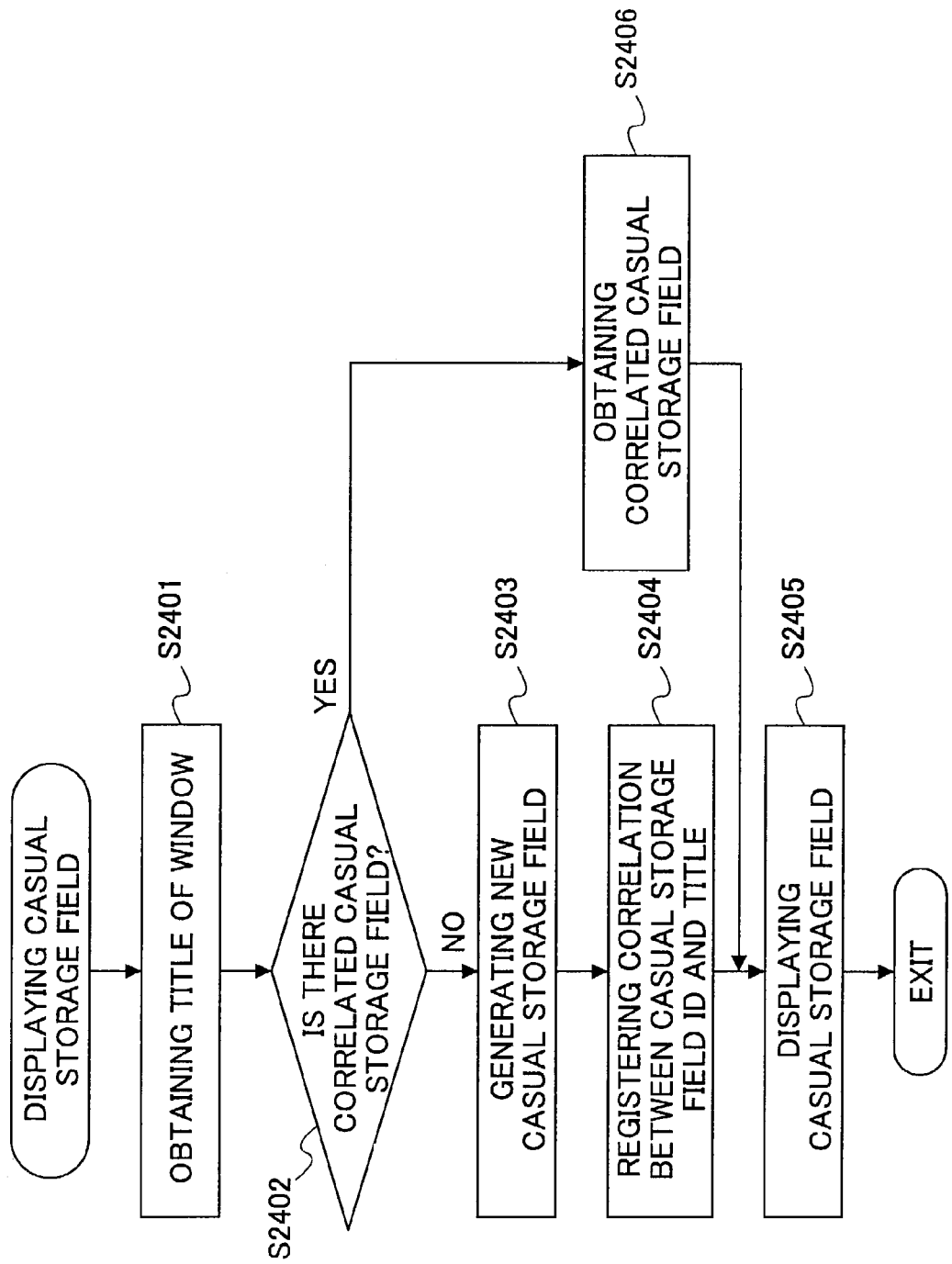
FIG. 30 is a flow chart for explaining a process of correlating a window to a casual storage field according to an embodiment.

FIG. 30 is a flow chart showing processing when the correlating operation is performed. If there is a casual storage field correlated with the window, the already correlated casual storage field is displayed (S2406). If there is no casual storage field correlated with the window, a new casual storage field is generated, and the corresponding relationship between the new casual storage field and the window is registered (S2403, S2404). The new casual storage field is displayed (S2405). In addition, in S2403, it is assumed that a unique ID is assigned to the new casual storage field.

Thanks to this procedure, the user can give the apparatus an instruction to display a casual storage field by a common operation without minding whether the casual storage field and the window are already correlated and whether the user needs to define a new relationship.

Figure 31:
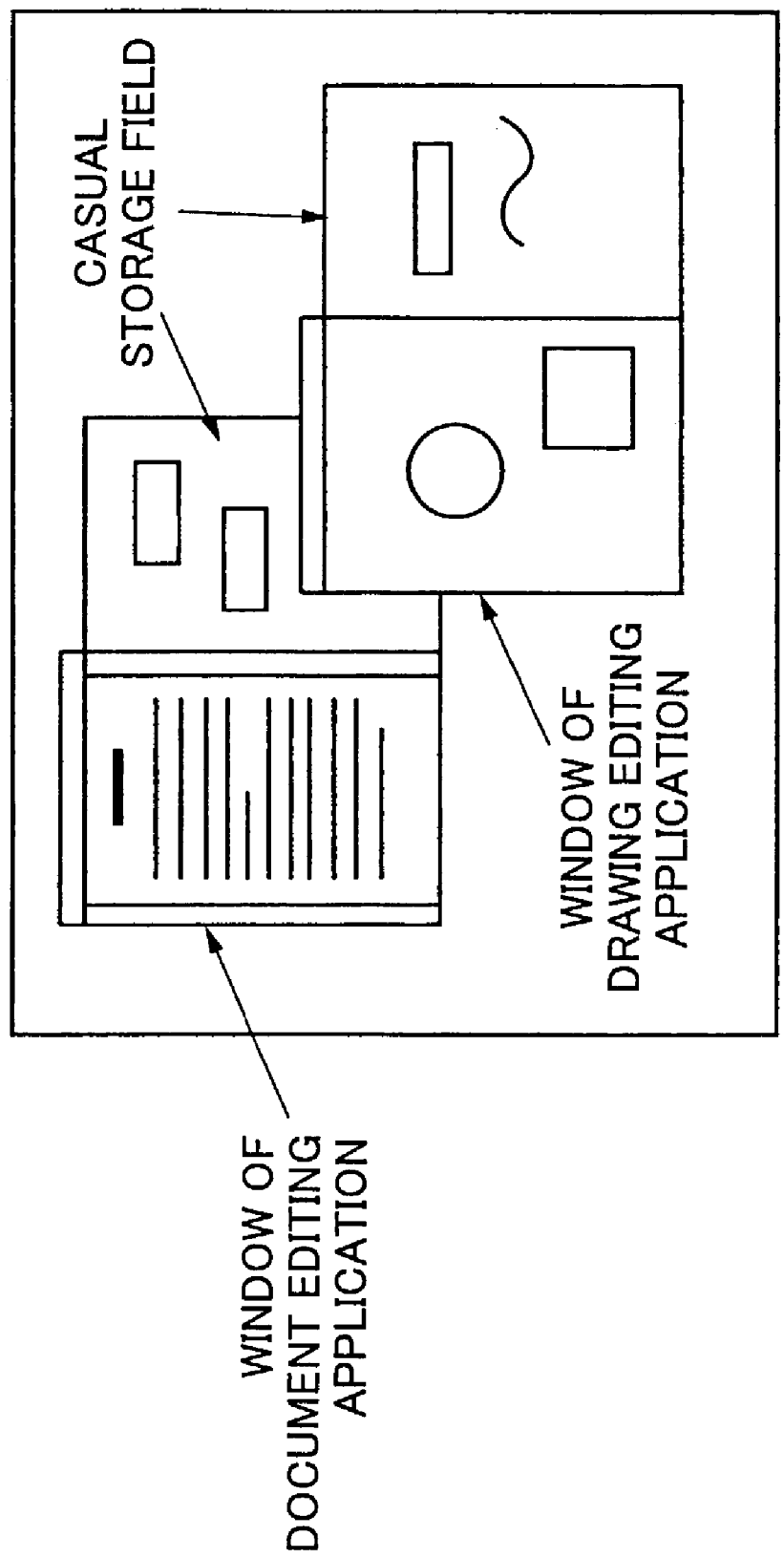
FIG. 31 is a schematic diagram for explaining a screen in which casual storage fields are disposed on the side of respective windows, according to an embodiment.

When displaying the casual storage field correlated with the window, the position and the size of the window are obtained, and the display region of the casual storage field is fitted to the position and the size. Accordingly, the relationship between the casual storage field and the window is showed in a manner in which the user can easily understand the relationship. For example, if the casual storage field is displayed as described above, a plurality of casual storage fields and respectively correlated windows can be displayed on the same screen in a well-organized manner, and the user can understand their corresponding relationships easily. FIG. 31 illustrates a screen on which the casual storage fields and the respective corresponding windows are disposed side by side by arranging the upper right corner of the window and the upper left corner of the casual storage field.

[Changing Display State of Casual Storage Field Depending on the Display State of Window]

Figure 32:
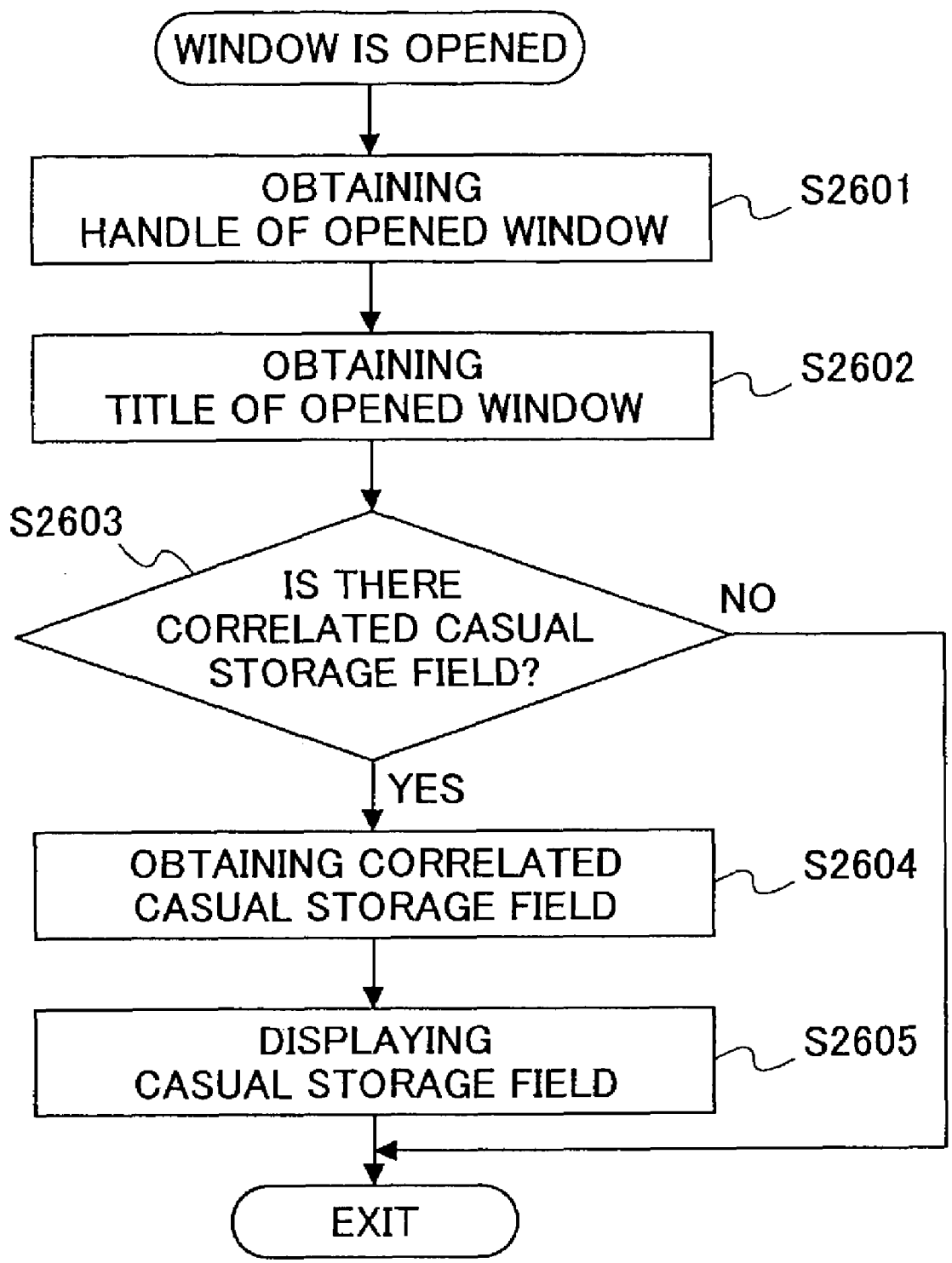
FIG. 32 is a flow chart for explaining a process of adjusting the display state of a casual storage field to the display state of a window, according to an embodiment.

The method of managing a casual storage field according to the present invention includes the step of observing the display state of a window. If there is a casual storage field correlated to an opened window, the casual storage field is displayed. FIG. 32 is a flow chart showing the procedure of this processing. When a new window is opened on the computer system, the window display state observing unit 208 detects the event and activates the processing of FIG. 32. The handle of the opened window is obtained by querying the operating system (S2501).

Subsequently, the title of the window is obtained (S2502). It is determined whether there is a casual storage field correlated to the obtained title, and if there is such a casual storage field, the casual storage field is obtained and displayed (S2503-S2505). If there is not such a casual storage field registered, nothing will be displayed.

If the display position or size of the window displaying a document is changed, the window display state observing unit 208 detects such an event. The window display state observing unit 208 updates the display state of the casual storage field so that the upper right corner of the window and the upper left corner of the casual storage field are arranged to keep the window and the casual storage field disposed side by side touching each other as showed in FIG. 31.

Furthermore, the window object of Microsoft Windows 2000™ is provided with a function to minimize a displayed window. The object of the window is not discarded, but the "minimized" window is hidden. The existence of the hidden window is indicated by an icon displayed in a region called the task bar on the screen. When a window that displays a document is minimized, the window display state observing unit 208 detects such an event. Further, if there exists a casual storage field correlated to the window, and it is displayed on the screen, the window display state observing unit 208 hides the casual storage field. When the window is displayed again (activated by operating "restoring to the original size"), the window display state observing unit 208 displays the correlated casual storage field.

As described above, since the display state of the casual storage field is adjusted to the display state of the window in which the document is displayed, the user can easily understand the relationship between the window and the casual storage field.

In addition, one can generate a computer program that causes a computer to perform the method of managing a casual storage field according to the present invention, and to store the computer program in a computer readable recording medium such as a magnetic disk. The computer to which the above computer program is installed operates as the apparatus for managing the casual storage field according to the present invention.

The data handled by the method of managing a casual storage field according to the present invention is different from the data handled by a conventional clipboard. The difference will be described below.

For example, the Windows 2000™ operating system can handle a DataObject that functions as a "clipboard". Software developers can use such a DataObject for a copy & paste operation and a drag & drop operation. The internal structure of the DataObject is not available to the public, but the interface of the DataObject is publicly known.

Figures 33, 34:
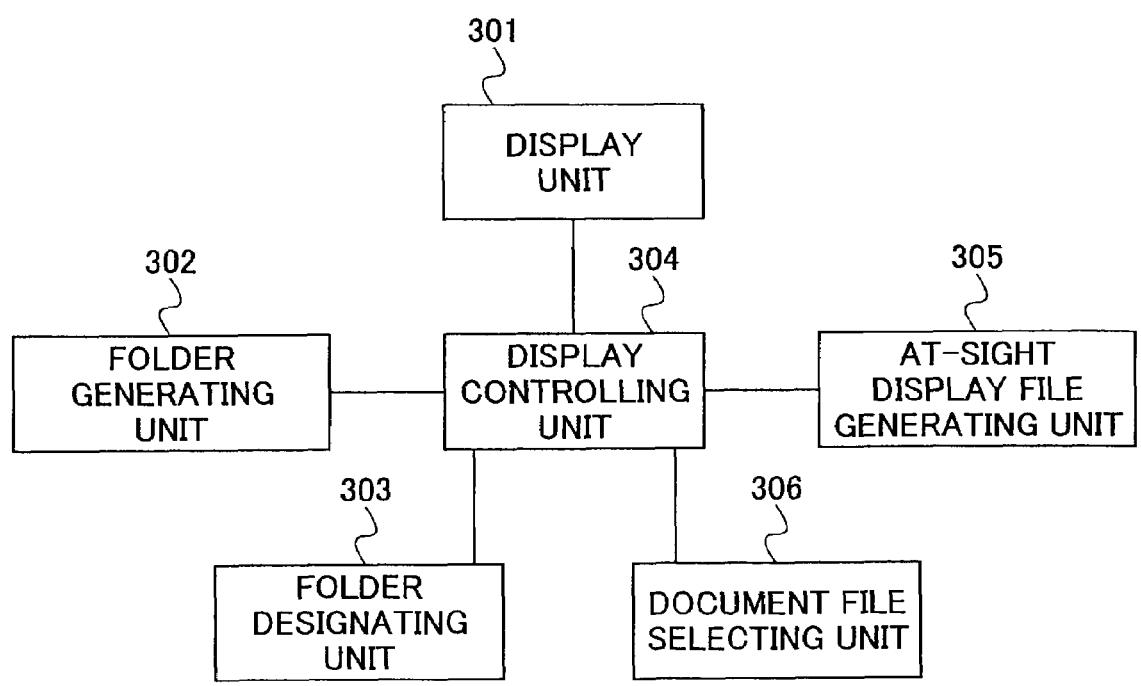
FIG. 33 illustrates a table retaining data items of a plurality of different data types.
FIG. 34 is a block diagram showing the functional structure of a conventional apparatus.

A DataObject can store therein data items of a plurality of different data types and information indicating the data types. Data items can be restored from the DataObject by the designated data types. Accordingly, in the DataObject, the data items and the information of the data types of the data items are stored separately in a manner in which they are correlated to each other as showed in FIG. 33, for example. If so, data items of a plurality of different data types can be stored in the DataObject.

The user may face difficulty when the user desires to store a plurality of text-type data items in the DataObject and to discriminate between them. Since the DataObject does not have a function of storing a data item in a memory device, the user cannot store the data items as a file or a record.

The method of managing a casual storage field according to the present invention can simultaneously retain a plurality of structured data (information element) like the DataObject. Accordingly, the method of managing a casual storage field according to the present invention can retain data items of a plurality of different data types. The data items retained by the casual storage field are stored in a recording medium such as a hard disk. Even if the user turns off the apparatus, the user can restore the data items from the recording medium.

According to the present invention, the casual storage field enables various application programs (not limited to specific application programs) to exchange information elements with each other.

The casual storage field can not only retain but also store the information elements. The user can restore the stored information elements when the user need to use them.

Since the casual storage field can obtain the data items related to the retained information elements and the transformed data items of which data type is transformed, the retained information elements can be used more efficiently.

The data items related to the retained information elements are, for example, the date and time of the casual storage and other data items included in the document from which the information elements are taken.

The transformation of data type according to the present invention includes, for example, the extraction of text from an image data item including the text, and the conversion between image formats (from JPEG to bit map, for example).

The preferred embodiments of the present invention are described above. The present invention is not limited to these embodiments, but various variations and modifications may be made without departing from the scope of the present invention.

This patent application is based on Japanese Laid-open Patent Application No. 2002-141632 filed on May 16, 2002, the entire contents of which are hereby incorporated by reference.

What is claimed is:

1. A method of managing a casual storage field, comprising the steps of:
receiving a plurality of information elements from one or more application programs, each information element including one or more data items, the receiving including determining whether data of a designated data type in the received plurality of information elements are stored in a mediate region provided by an operating system, and when it is determined that the mediate region stores the data of the designated data type in the plurality of information elements, obtaining the plurality of information elements from the mediate region, and when it is determined that the mediate region does not store the data of the designated type in the plurality of information elements, obtaining the plurality of information elements from the one or more application programs;
retaining the received information elements in said casual storage field;
displaying a state of said casual storage field and the retained information elements; and
handing over, in response to a user request, one or more of the retained information elements to one of the application programs;
wherein, when each one of the information elements is received, date and time at which the information element is received are obtained and retained in the information element.

2. The method as claimed in claim 1, wherein, if a plurality of the data items of different types are handed over for one of the information elements, the plurality of the data items are retained in said casual storage field with information indicating the data types of the data items.

3. The method as claimed in claim 1, wherein, when each one of the information elements is received, the one or more data items included in the information element are identified by a query to the application program that transfers the information element.

4. The method as claimed in claim 1, further comprising the step of transforming a data type of each of the data items included in the information elements received from the application programs or retained in said casual storage field.

5. The method as claimed in claim 1, wherein, if one of the information elements is linked to a document, said document to which the one of the information elements is linked is opened and an image of the opened document is displayed.

6. The method as claimed in claim 1, further comprising the steps of:
storing the information elements retained in said casual storage field; and
restoring the stored information elements in said casual storage field.

7. The method as claimed in claim 6, wherein
each one of the information elements retained in said casual storage field is disposed in two or three dimensional space; and
when the information elements retained in said casual storage field are stored, each one of the information elements is stored with information about the disposition of the one of the information elements in said two or three dimensional space.

8. The method as claimed in claim 1, further comprising the steps of:
retaining, in response to a user selection, the selected one of the information elements; and
moving a display position of the selected one of the information elements.

9. The method as claimed in claim 8, wherein a plurality of information elements among the information elements can be selected, and the display position of each of the plurality of information elements is moved.

10. The method as claimed in claim 8, further comprising the steps of:

defining an information element group;

registering, in response to a user selection, the selected one of the information elements to said information element group as a member; and deleting, in response to another user selection, a selected member from said information element group.

11. The method as claimed in claim 10, wherein a plurality of information elements among the information elements or a plurality of the information element groups can be selected.

12. The method as claimed in claim 10, wherein another information element group can be registered to said information element group as a member; and yet another information element group registered in said information element group can be deleted from said information element group.

13. The method as claimed in claim 10, further comprising the steps of:

retaining, in response to a user selection, the selected information element group; and moving the display position of the selected information element group.

14. The method as claimed in claim 10, wherein, in the step of displaying a state of said casual storage field, said information element group is correlated to a display region and all members of said casual storage field are displayed in said display region.

15. The method as claimed in claim 10, further comprising the step of inputting one or more drawing elements in a display region of said casual storage field in which the information elements and the information element groups are displayed.

16. The method as claimed in claim 15, wherein in response to a user selection, the selected one of the drawing elements is retained; and the display position of the selected one of the drawing elements is moved.

17. The method as claimed in claim 1, further comprising the step of correlating said casual storage field to a designated window; wherein said casual storage field is managed in correlation with the designated window.

18. The method as claimed in claim 17, wherein said casual storage field is displayed in response to a user's instruction by selecting a specific menu item from a system menu connected to a title bar of the designated window.

19. The method as claimed in claim 17, further comprising the step of observing a display state of the designated window; and displaying, if the designated window is opened and the casual storage field correlated to the opened window exists, the casual storage field correlated to the designated window.

20. An apparatus for managing a casual storage field, comprising:

a receiving unit that receives a plurality of information elements from one or more application programs, each information element including one or more data items, the receiving unit further determining whether data of a designated data type in the received plurality of information elements are stored in a mediate region provided by an operating system, and when it is determined that the mediate region stores the data of the designated data type in the plurality of information elements, obtaining the plurality of information elements from the mediate region, and when it is determined that the mediate region does not store the data of the designated type in the plurality of information elements, obtaining the plurality of information elements from the one or more application programs;

a retaining unit that retains the received information elements in said casual storage field;

a displaying unit that displays a state of said casual storage field and the retained information elements and a handing-over unit that hands over, in response to a user request, one or more of the retained information elements to one of the application programs;

wherein, when said receiving unit receives each one of the information elements, said casual storage field obtains and retains date and time at which said receiving unit receives the information element, in the information element.

21. The apparatus as claimed in claim 20, wherein, if said receiving unit receives a plurality of the data items of different types for one of the information elements, said casual storage field retains the plurality of the data items in a manner in which the types of the data items can be discriminated between each other.

22. The apparatus as claimed in claim 20, wherein, when said receiving unit receives each one of the information elements, said receiving unit identifies the one or more data items included in the information element by querying the application program that transfers the information element.

23. The apparatus as claimed in claim 20, further comprising a transforming unit that transforms a data type of each of the data items included in the information elements received from the application programs or retained in said casual storage field.

24. The apparatus as claimed in claim 20, wherein, if one of the information elements is linked to a document, said displaying unit displays the one of the information elements by activating said document to which the one of the information elements is linked.

25. The apparatus as claimed in claim 20, further comprising:

a storing unit that stores the information elements retained in said casual storage field; and a restoring unit that restores the stored information elements in said casual storage field.

26. The apparatus as claimed in claim 25, wherein said displaying unit disposes each one of the information elements retained in said casual storage field in two or three dimensional space; and when said storing unit stores the information elements retained in said casual storage field, said storing unit stores each one of the information elements with information about the disposition of the one of the information elements in said two or three dimensional space.

27. The apparatus as claimed in claim 20, further comprising:

a selecting unit that retains, in response to a user selection, the selected one of the information elements; and a moving unit that moves a display position of the selected one of the information elements.

28. The apparatus as claimed in claim 27, wherein said selecting unit selects a plurality of information elements among the information elements, and said moving unit moves the display position of each of the plurality of information elements.

29. The apparatus as claimed in claim 27, further comprising:

a defining unit that defines an information element group;

a registering unit that registers, in response to a user selection, the selected one of the information elements to said information element group as a member; and a deleting unit that deletes, in response to another user selection, a selected member from said information element group.

30. The apparatus as claimed in claim 29, wherein said selecting unit simultaneously selects a plurality of information elements among the information elements or a plurality of the information element groups.

31. The apparatus as claimed in claim 29, wherein said registering unit registers another information element group to said information element group as a member; and said deleting unit deletes yet another information element group registered in said information element group from said information element group.

32. The apparatus as claimed in claim 29, wherein said selecting unit retains, in response to a user selection, the selected information element group; and said moving unit moves the display position of the selected information element group.

33. The apparatus as claimed in claim 29, wherein said information element group is correlated to a display region and is displayed.

34. The apparatus as claimed in claim 29, further comprising an inputting unit that inputs one or more drawing elements in a display region of said casual storage field in which the information elements and the information element groups are displayed.

35. The apparatus as claimed in claim 34, wherein said selecting unit retains, in response to a user selection, the selected one of the drawing elements; and said moving unit moves the display position of the selected one of the drawing elements.

36. The apparatus as claimed in claim 20, further comprising a correlating unit that correlates said casual storage field to a designated window; wherein said casual storage field is managed in correlation with the designated window.

37. The apparatus as claimed in claim 36, wherein said casual storage field is displayed in response to a user's instruction by selecting a specific menu item from a system menu connected to a title bar of the designated window.

38. The apparatus as claimed in claim 36, further comprising an observing unit that observes a display state of the designated window; and said displaying unit displays, if the designated window is opened and the casual storage field correlated to the opened window exists, the casual storage field correlated to the designated window.

39. An image forming apparatus comprising the apparatus for managing a casual storage field as claimed in claim 20.

40. An inspiration support system comprising the apparatus for managing a casual storage field as claimed in claim 20.

41. A computer readable recording medium containing a computer program to control a computer to perform a method of managing a casual storage field, comprising the steps of:

receiving a plurality of information elements from one or more application programs, each information element including one or more data items, the receiving including determining whether data of a designated data type in the received plurality of information elements are stored in a mediate region provided by an operating system, and when it is determined that the mediate region stores the data of the designated data type in the plurality of information elements, obtaining the plurality of information elements from the mediate region, and when it is determined that the mediate region does not store the data of the designated type in the plurality of information elements, obtaining the plurality of information elements from the one or more application programs;

retaining the received information elements in said casual storage field;

displaying a state of said casual storage field and the retained information elements; and handing over, in response to a user request, one or more of the retained information elements to one of the application programs;

wherein, when each one of the information elements is received, date and time at which the information element is received are obtained and retained in the information element.

* * * * *